United States Patent
Sinatra et al.

(10) Patent No.: US 12,344,784 B2
(45) Date of Patent: Jul. 1, 2025

(54) STABILIZED PEROVSKITE QUANTUM DOT MATERIAL

(71) Applicant: Quantum Advanced Solutions Ltd, Southampton (GB)

(72) Inventors: Lutfan Sinatra, Thuwal (SA); Marat Lutfullin, Southampton (GB); Osman Mohammed Bakr, Jeddah (SA)

(73) Assignee: Quantum Advanced Solutions Limited, Kidlington (GB)

( * ) Notice: Subject to any disclaimer, the term of this patent is extended or adjusted under 35 U.S.C. 154(b) by 686 days.

(21) Appl. No.: 17/463,298

(22) Filed: Aug. 31, 2021

(65) Prior Publication Data

US 2022/0064524 A1 Mar. 3, 2022

Related U.S. Application Data

(60) Provisional application No. 63/181,112, filed on Apr. 28, 2021, provisional application No. 63/072,886, filed on Aug. 31, 2020.

(51) Int. Cl.

| | | |
|---|---|---|
| *C09K 11/66* | (2006.01) | |
| *B82Y 20/00* | (2011.01) | |
| *B82Y 30/00* | (2011.01) | |
| *B82Y 40/00* | (2011.01) | |
| *C01G 21/00* | (2006.01) | |
| *C08F 2/50* | (2006.01) | |
| *C08F 20/06* | (2006.01) | |
| *C08J 5/18* | (2006.01) | |
| *C08K 3/22* | (2006.01) | |
| *C08K 3/36* | (2006.01) | |
| *C09K 11/02* | (2006.01) | |

(52) U.S. Cl.
CPC .......... *C09K 11/665* (2013.01); *C01G 21/006* (2013.01); *C08F 2/50* (2013.01); *C08F 20/06* (2013.01); *C08J 5/18* (2013.01); *C08K 3/22* (2013.01); *C08K 3/36* (2013.01); *C09K 11/02* (2013.01); *C09K 11/664* (2013.01); *B82Y 20/00* (2013.01); *B82Y 30/00* (2013.01); *B82Y 40/00* (2013.01); *C01P 2002/34* (2013.01); *C01P 2004/64* (2013.01); *C01P 2006/60* (2013.01); *C08K 2003/2241* (2013.01); *G02B 2207/101* (2013.01)

(58) Field of Classification Search
CPC ...... C09K 11/02; C09K 11/665; C09K 11/664
See application file for complete search history.

(56) References Cited

U.S. PATENT DOCUMENTS

| | | |
|---|---|---|
| 10,294,420 B2 | 5/2019 | Lüchinger et al. |
| 10,329,484 B2 | 6/2019 | Kovalenko et al. |
| 11,098,247 B2 | 8/2021 | Lüchinger et al. |
| 2015/0083970 A1 | 3/2015 | Koh et al. |
| 2016/0349428 A1 | 12/2016 | Dubrow et al. |
| 2017/0194540 A1* | 7/2017 | Liu ............ H01L 33/504 |
| 2017/0369776 A1 | 12/2017 | Lüchinger et al. |
| 2018/0208840 A1* | 7/2018 | Lüchinger ........... C09D 11/50 |
| 2019/0018287 A1 | 1/2019 | Lüchinger et al. |
| 2019/0145587 A1 | 5/2019 | Dursun et al. |
| 2021/0395609 A1* | 12/2021 | Naito .............. C09K 11/61 |

FOREIGN PATENT DOCUMENTS

| | | | |
|---|---|---|---|
| CN | 106816520 | * 6/2017 | |
| EP | 3230401 B1 | 6/2018 | |
| EP | 3458547 B1 | 5/2020 | |
| WO | WO 2019094207 A1 | 5/2019 | |
| WO | WO-2020085516 A1 * | 4/2020 | ............ C09K 11/02 |

OTHER PUBLICATIONS

Chen et al., "All-inorganic perovskite nanocrystal scintillators," *Nature* 561:88-93, Sep. 2018. (22 pages).

Huang et al., "Impact of H₂O on organic-inorganic hybrid perovskite solar cells," *Energy Environ Science* 10:2284-2311, Nov. 2017. (28 pages).

(Continued)

*Primary Examiner* — C Melissa Koslow

(74) *Attorney, Agent, or Firm* — Kevin J Fournier Intellectual Property Legal Services Ltd.; Kevin J Fournier

(57) ABSTRACT

Described herein are materials comprising (1) a monomer or a polymer; (2) perovskite quantum dots interspersed in the monomer or the polymer, each of the perovskite quantum dots independently having the formula:

$$Cs_a(MA)_b(FA)_cRb_dPb_pSn_rBi_sCl_xBr_yI_z,$$

wherein:

MA is $CH_3NH_3$;

FA is $HC(NH_2)_2$;

a, b, c, and d are each independently a number from 0 to 1, provided that the sum of a, b, c, and d is 1;

p, r, and s are each independently a number from 0 to 1, provided that the sum of p, r, and s is 1; and x, y, and z are each independently a number from 0 to 3, provided that the sum of x, y, and z is 3; and (3) an additive interspersed in the monomer or the polymer, the additive comprising: a halide-based additive; a light scattering agent having the formula: $M_2O_3$, wherein M is, at each occurrence, independently, a metal, provided that at most one instance of M is a group 13 element; or both. Also described are devices comprising such materials, as well as methods of forming such materials.

15 Claims, 20 Drawing Sheets

(20 of 20 Drawing Sheet(s) Filed in Color)

(56) References Cited

OTHER PUBLICATIONS

Kang et al., "High-speed colour-converting photodetector with all-inorganic CsPbBr$_3$ perovskite nanocrystals for ultraviolet light communication," *Light: Science & Applications* 8:94, Oct. 2019. (12 pages).
Kovalenko et al., "Properties and potential optoelectronic applications of lead halide perovskite nanocrystals," *Science* 358:745-750, Nov. 2017. (7 pages).
Li et al., "CsPbX$_3$ Quantum Dots for Lighting and Displays: Room-Temperature Synthesis, Photoluminescence Superiorities, Underlying Origins and White Light-Emitting Diodes," *Advanced Functional Materials* 26:2435-2445, Feb. 2016. (11 pages).
Nanosys Inc., "Nanosys Quantum Dot Products," 2021, URL= https://nanosys.com/roadmap, download date Jun. 13, 2023. (12 pages).
Protesescu et al., "Nanocrystals of Cesium Lead Halide Perovskites (CsPbX$_3$, X = Cl, Br, and I): Novel Optoelectronic Materials Showing Bright Emission with Wide Color Gamut," *Nano Letters* 15:3692-3696, Jan. 2015. (5 pages).
Samsung, "Quantum Dots: Solution for a Wider Color Gamut," URL=https://pid.samsungdisplay.com/en/learning-center/white-papers/quantum-dot-technology, download date Jun. 13, 2023. (12 pages).
Scheidt et al., "Interfacial Charge Transfer between Excited CsPbBr$_3$ Nanocrystals and TiO$_2$: Charge Injection versus Photodegradation," *The Journal of Physical Chemistry Letters* 9:5962-5969, Sep. 2018. (8 pages).
Sinatra et al., "P-203: Late-News Poster: Novel Techniques for Highly Stable Luminescent Perovskite Halide Quantum Dots," *SID Symposium Digest of Technical Papers* 49(1):1681-1684, May 2018. (4 pages).
Sinatra et al., "P-124: Perovskite Quantum Dots Display: Challenges and Opportunities," *SID Symposium Digest of Technical Papers* 50(1):1712-1715, Jun. 2019. (4 pages).
Swarnkar et al., "Colloidal CsPbBr$_3$ Perovskite Nanocrystals: Luminescence beyond Traditional Quantum Dots," *Angewandte Chemie International Edition* 54:15424-15428, Nov. 2015. (20 pages).
Tyson et al., "Large Thermal Motion in Halide Perovskites," *Scientific Reports* 7:9401, Aug. 2017. (10 pages).
Wu et al., "Highly Luminescent and Stable Halide Perovskite Nanocrystals," *ACS Energy Letters* 4:673-681, Feb. 1, 2019. (9 pages).
Zhang et al., "Brightly Luminescent and Color-Tunable Colloidal CH$_3$NH$_3$PbX$_3$ (X = Br, I, Cl) Quantum Dots: Potential Alternatives for Display Technology," *ACS Nano* 9(4):4533-4542, Mar. 2015. (11 pages).
Zhao et al., "Investigation of the Hydrolysis of Perovskite Organometallic Halide CH$_3$NH$_3$PbI$_3$ in Humidity Environment," *Scientific Reports* 6:21976, Feb. 2016. (7 pages).
Zhou et al., "Charge Transfer Boosting Moisture Resistance of Seminude Perovskite Nanocrystals via Hierarchical Alumina Modulation," *The Journal of Physical Chemistry Letters* 11:3159-3165, Apr. 3, 2020. (7 pages).

\* cited by examiner

STABILIZED PEROVSKITE QUANTUM DOT MATERIAL

BACKGROUND

Technical Field

The present disclosure generally relates to materials comprising perovskite quantum dots, devices that include such materials, and methods of making and using the same.

Description of the Related Art

Quantum dots are nanocrystals of semiconductor materials. Due to their nanoscale size, these tiny semiconductors have unique optical and electronic properties that differ from its bulk condition. These unique electronic properties are known as quantum confinement effects.

Although many types of quantum dots are known, the majority have unresolved issues of stability that prevent their commercial implementation. Currently, two types of quantum dots are commercially used, CdSe and InP. However, these types of quantum dots have significant drawbacks. First, cadmium is highly toxic. According to the Restrictions of Hazardous Substances Directive by the European Union, a maximum 0.01%, by weight, of Cd is allowed in a polymer film. However, in order to provide an efficient device, a minimum of 0.05%, by weight, is needed. Second, InP quantum dots have broad full width to half maximum (FWHM) ranging from 35 nanometer (nm) to 45 nm, which does not allow for wider color gamut displays.

Accordingly, while progress has been made in this field, there remains a need in the art for improved quantum dot materials.

BRIEF SUMMARY

The present disclosure provides materials comprising perovskite quantum dots, an additive, and a polymer, as well as methods of making the same. Also described herein are devices comprising such a material.

In aspects, the present disclosure provides materials comprising:
a monomer or a polymer;
perovskite quantum dots interspersed in the monomer or polymer, each of the perovskite quantum dots independently having the formula:

$Cs_a(MA)_b(FA)_cRb_dPb_pSn_rBi_sCl_xBr_yI_z$, wherein:
MA is $CH_3NH_3$;
FA is $HC(NH_2)_2$;
a, b, c, and d are each independently a number from 0 to 1, provided that the sum of a, b, c, and d is 1;
p, r, and s are each independently a number from 0 to 1, provided that the sum of p, r, and s is 1; and
x, y, and z are each independently a number from 0 to 3, provided that the sum of x, y, and z is 3; and
an additive interspersed in the monomer or the polymer, the additive comprising:
a halide-based additive, a light scattering agent having the formula $M_2O_3$, wherein M is, at each occurrence, independently, a metal, provided that at most one instance of M is a group 13 element; both.

In further aspects, provided herein are devices comprising a material of the disclosure.

In additional aspects, the present disclosure provides methods for forming a material of the disclosure, the method comprising: mixing (a) the monomer or the polymer, and (b) the perovskite quantum dots.

In still further aspects, provided herein are methods for forming a film comprising spreading a material described herein; and forming the film by curing the material.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

In the figures, identical reference numbers identify similar elements. The sizes and relative positions of elements in the figures are not necessarily drawn to scale and some of these elements are enlarged and positioned to improve figure legibility. Further, the particular shapes of the elements as drawn are not intended to convey any information regarding the actual shape of the particular elements, and have been solely selected for ease of recognition in the figures.

DETAILED DESCRIPTION

Figure 1B:
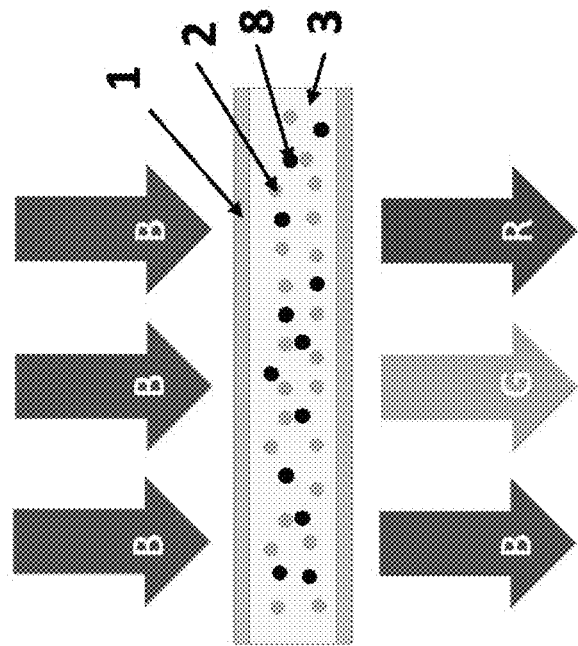
FIG. 1B shows a graphic representation of another film of the present disclosure and schematic of its working principle as a light down conversion layer.

The present disclosure relates to materials comprising (1) perovskite quantum dots; (2) an additive comprising a halide based additive, a light scattering agent having the formula: $M_2O_3$, wherein M is, at each occurrence, independently, a metal, provided that at most one instance of M is a group 13 element, Prior to setting forth this disclosure in more detail, it may be helpful to an understanding thereof to provide definitions of certain terms to be used herein. Additional definitions are set forth throughout this disclosure.

A "quantum dot" is a nanoscale, luminescent crystal of a semiconductor material.

The term "perovskite" as used herein describes a halide perovskite material with a perovskite crystal structure.

The term "polymer" refers to a material comprising a macromolecule composed of repeated subunits. Each subunit is referred to as a monomer. Polymers may be natural, semi-synthetic, or synthetic. As used herein, "polymer" includes polymer resins and oligomers.

A "polymer resin" is an amorphous solid, semi-crystalline solid, or liquid (e.g., highly viscous liquid, medium viscosity liquid, or low viscosity liquid) that has a polymeric or semi-polymeric structure. Polymer resins may be thermoplastic resins or thermosetting resins. Thermoplastic resins can be repeatedly molded and melted by cooling and heating, respectively, as no chemical changes generally take place during molding. Thermoset resins undergo chemical reactions (e.g., cross-linking) during the molding process.

An "oligomer" is a material comprising less than ten repeating subunits. Oligomers include dimers, trimers, and tetramers, which are oligomers made up of two, three, and four monomers, respectively.

The term "visible light" as used herein refers to light having a wavelength ranging from 380 nanometers (nm) to 750 nm. Violet light has a wavelength ranging from 380 nm to 450 nm. Blue light has a wavelength ranging from 450 nm to 495 nm. Green light has a wavelength ranging from 495 nm to 570 nm. Yellow light has a wavelength ranging from 570 nm to 590 nm. Orange light has a wavelength ranging from 590 nm to 620 nm. Red light has a wavelength ranging from 620 nm to 750 nm.

The term "ultraviolet light" refers to light having a wavelength ranging from 100 nm to 400 nm.

"Alkyl" refers to a saturated, straight or branched hydrocarbon chain radical consisting solely of carbon and hydrogen atoms, having from one to twelve carbon atoms ($C_1$-$C_{12}$ alkyl), one to eight carbon atoms ($C_1$-$C_8$ alkyl) or one to six carbon atoms ($C_1$-$C_6$ alkyl), and which is attached to the rest of the molecule by a single bond, e.g., methyl, ethyl, n-propyl, 1-methylethyl (iso-propyl), n-butyl, n-pentyl, 1,1-dimethylethyl (t-butyl), 3-methylhexyl, 2-methylhexyl and the like. Unless stated otherwise specifically in the specification, an alkyl group is optionally substituted.

"Alkenyl" refers to an unsaturated, straight or branched hydrocarbon chain radical consisting solely of carbon and hydrogen atoms, which contains one or more carbon-carbon double bonds, having from two to twelve carbon atoms ($C_2$-$C_{12}$ alkenyl), preferably two to eight carbon atoms ($C_2$-$C_8$ alkenyl) or two to six carbon atoms ($C_2$-$C_6$ alkenyl), and which is attached to the rest of the molecule by a single bond, e.g., ethenyl, prop-1-enyl, but-1-enyl, pent-1-enyl, penta-1,4-dienyl, and the like. Unless stated otherwise specifically in the specification, an alkenyl group is optionally substituted.

"Aryl" refers to a carbocyclic ring system radical comprising 6 to 18 carbon atoms and at least one carbocyclic aromatic ring. For purposes of embodiments of this invention, the aryl radical is a monocyclic, bicyclic, tricyclic or tetracyclic ring system, which may include fused or bridged ring systems. Aryl radicals include, but are not limited to, aryl radicals derived from aceanthrylene, acenaphthylene, acephenanthrylene, anthracene, azulene, benzene, chrysene, fluoranthene, fluorene, as-indacene, s-indacene, indane, indene, naphthalene, phenalene, phenanthrene, pleiadene, pyrene, and triphenylene. Unless stated otherwise specifically in the specification, the term "aryl" or the prefix "ar-" is meant to include aryl radicals that are optionally substituted.

"Cycloalkyl" refers to a non-aromatic monocyclic or polycyclic carbocyclic radical consisting solely of carbon and hydrogen atoms, which may include fused or bridged ring systems, having from three to fifteen ring carbon atoms, from three to ten ring carbon atoms, or from three to eight ring carbon atoms and which is saturated or partially unsaturated and attached to the rest of the molecule by a single bond. Monocyclic radicals include, for example, cyclopropyl, cyclobutyl, cyclopentyl, cyclohexyl, cycloheptyl, and cyclooctyl. Polycyclic radicals include, for example, adamantyl, norbornyl, decalinyl, 7,7-dimethyl-bicyclo[2.2.1]

heptanyl, and the like. Unless otherwise stated specifically in the specification, a cycloalkyl group is optionally substituted.

"Amino" refers to the —NH$_2$ radical.
"Hydroxy" or "hydroxyl" refers to the —OH radical.
"Oxo" refers to the =O substituent.
"Phosphate" refers to the —OP=O(OH)$_2$ substituent.
"Sulfonic acid" refers to the —S(=O)$_2$OH substituent.
"Carboxyl" refers to the —CO$_2$H radical.

The use of the words "optional" or "optionally" means that the subsequently described event or circumstances may or may not occur, and that the description includes instances wherein the event or circumstance occurs and instances in which it does not.

In the present description, any concentration range, percentage range, ratio range, or integer range is to be understood to include the value of any integer within the recited range and, when appropriate, fractions thereof (such as one tenth and one hundredth of an integer), unless otherwise indicated. Also, any number range recited herein relating to any physical feature, such as polymer subunits, size, or thickness, are to be understood to include any integer within the recited range, unless otherwise indicated. As used herein, the term "about" means+20%, +10%, +5% or +1% of the indicated range, value, or structure, unless otherwise indicated. It should be understood that the terms "a" and "an" as used herein refer to "one or more" of the enumerated components. The use of the alternative (e.g., "or") should be understood to mean either one, both, or any combination thereof of the alternatives.

Unless the context requires otherwise, throughout the present specification and claims, the word "comprise" and variations thereof, such as, "comprises" and "comprising," as well as synonymous terms like "include" and "have" and variants thereof, are to be construed in an open, inclusive sense; that is, as "including, but not limited to," such that recitation of items in a list is not to the exclusion of other like items that may also be useful in the materials, compositions, devices, and methods of this technology. Although the open-ended term "comprising," as a synonym of terms such as including, containing, or having, is used herein to describe and claim the disclosure, the present technology, or embodiments thereof, may alternatively be described using more limiting terms such as "consisting of" or "consisting essentially of" the recited ingredients.

Unless defined otherwise, all technical and scientific terms herein have the same meaning as commonly understood by one of ordinary skill in the art to which this disclosure belongs.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Similarly, the terms "can" and "may" and their variants are intended to be non-limiting, such that recitation that an embodiment can or may comprise certain elements or features does not exclude other embodiments of the present technology that do not contain those elements or features. Furthermore, the particular features, structures, or characteristics may be combined in any suitable manner in one or more embodiments.

In the following description, certain specific details are set forth in order to provide a thorough understanding of various embodiments of this disclosure. However, one skilled in the art will understand that the disclosure may be practiced without these details.

As noted above, the present disclosure provides materials that comprise perovskite quantum dots. As used herein the term "perovskite quantum dot" refers to a halide perovskite quantum dot having the formula:

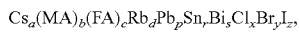

wherein:
MA is CH$_3$NH$_3$;
FA is HC(NH$_2$)$_2$;
a, b, c, and d are each independently a number from 0 to 1, provided that the sum of a, b, c, and d is 1;
p, r, and s are each independently a number from 0 to 1, provided that the sum of p, r, and s is 1; and
x, y, and z are each independently a number from 0 to 3, provided that the sum of x, y, and z is 3.

In embodiments, each of the perovskite quantum dots independently have the formula: $Cs_a(MA)_b(FA)_cRb_aPb_pSn_rBi_sCl_xBr_yI_z$. In embodiments, each of the perovskite quantum dots independently have the formula: $Cs_a(MA)_b(FA)\text{-}Pb_pSn_rBi_sCl_xBr_yI_z$.

In some embodiments, each of the perovskite quantum dots independently have the formula: $Cs_a(MA)_b(FA)_cPbCl_xBr_yI_z$.

In particular embodiments, the perovskite quantum dots comprise MAPbI$_3$, MAPbBr$_3$, FAPbBr$_3$, FAPbI$_3$, MAPbCl$_3$, MAPbBr$_2$Cl, FAPbCl$_3$, CsPbI$_3$, CsPbCl$_3$, CsPbBr$_3$, CsPbCl$_x$Br$_y$, CsPbBr$_y$I$_z$, or a combination thereof, wherein the sum of x and y is 3 or wherein the sum of y and z is 3. In specific embodiments, the perovskite quantum dots comprise CsPbBr$_3$. In particular embodiments, the perovskite quantum dots are CsPbBr$_3$. In particular embodiments, the perovskite quantum dots comprise FASnI$_3$, FASnBr$_3$, FASnCl$_3$, MASnI$_3$, MASnBr$_3$, and MASnCl$_3$, CsSnI$_3$, CsSnBr$_3$, CsSnC$_{13}$, or a combination thereof.

Perovskite quantum dots have excellent optical properties, such as high color purity, high absorption coefficient, and emission tunability. As is understood, perovskite quantum dots absorb light at a first wavelength (i.e., the excitation wavelength) and emit light at a second wavelength (i.e., the emission wavelength) that is longer than the first wavelength. In various embodiments, the excitation wavelength is blue, UV, red, or a combination thereof. In particular embodiments, the excitation wavelength is blue; UV; blue and red; UV, blue, and red.

Further, the visible emission range (e.g., from blue (450 nm) to red (690 nm)) can be selected by varying the composition of the perovskite quantum dot. For example, in CsPbClxBryIz quantum dots, the visible emission range can be selected based on the halide chosen, as described in Protesescu, L., et al., Nano Lett., 2015. 15: p. 3692-3696, which is incorporated by reference herein with regard to the teachings regarding the same. Additionally, in some embodiments, the band gap of the quantum dots can be altered by controlling the size of the quantum dots.

In embodiments, the disclosed material comprises green emitting perovskite quantum dots, red emitting perovskite quantum dots, or both.

In some embodiments, the perovskite quantum dots are green emitting. In some such embodiments, the perovskite quantum dots have the formula: $Cs_a(MA)_b(FA)cPbBr3$. Such perovskite quantum dots have a high Photoluminescence Quantum Yield (PLQY; e.g., up to 100%), a narrow full width to half maximum (FWHM; e.g., less than 20 nm or less than 25 nm). In specific embodiments, the perovskite quantum dots comprise MAPbBr$_3$, FAPbBr$_3$, or a combination thereof. In particular embodiments, the perovskite quantum dots are MAPbBr$_3$. In other embodiments, the perovskite quantum dots are FAPbBr$_3$. In various embodiments, such perovskite quantum dots have an emission ranging from 524 nm to 535 nm. In other embodiments, the perovskite quantum dots comprise CsPbBr$_3$. In embodiments, such perovskite quantum dots have an emission ranging from 510 nm to 515 nm.

In other embodiments, the perovskite quantum dots are red emitting (e.g., 630 nm). In some embodiments, the perovskite quantum dots have the formula: CsPbBr$_y$I$_z$, wherein the sum of y and z is 3.

In further embodiments, the perovskite quantum dots are blue emitting (e.g., 450 nm). In some embodiments, the perovskite quantum dots have the formula: CsPbCl$_x$Br$_y$, wherein the sum of x and y is 3.

A concentration of perovskite quantum dots in a material may be selected based on the application. In embodiments, the material comprises the perovskite quantum dots in a concentration ranging from 0.01% to 75%, by weight. In some embodiments, the material comprises the perovskite quantum dots in a concentration ranging from 0.05% to 75%, by weight. In some embodiments, the material comprises perovskite quantum dots in a concentration ranging from 0.1% to 60%, by weight. In some embodiments, the material comprises perovskite quantum dots in a concentration ranging from 10% to 70%, by weight. In some embodiments, the material comprises perovskite quantum dots in a concentration ranging from 20% to 60%, by weight. For example, for LCD color filter applications, the material generally comprises perovskite quantum dots in a concentration ranging from 20% to 60%, by weight. In other embodiments, the material comprises perovskite quantum dots in a concentration ranging from 0.1% to 0.5%, by weight. For example, for LCD backlighting applications, the material generally comprises perovskite quantum dots in a concentration ranging from 0.1% to 0.5%, by weight. In further embodiments, the material comprises perovskite quantum dots in a concentration ranging from 0.01% to 0.75%, by weight. In additional embodiments, the material comprises perovskite quantum dots in a concentration ranging from 0.05% to 0.75%, by weight. In particular embodiments, the material comprises perovskite quantum dots in a concentration ranging from 0.3% to 0.5%, by weight. For example, in display backlighting applications the concentration of quantum dots generally ranges from 0.3% to 0.5%, by weight. In specific embodiments, the material comprises perovskite quantum dots in a concentration of about 0.5%, by weight.

In embodiments, the perovskite quantum dots have an average diameter ranging from 2 nm to 100 nm. In further embodiments, the perovskite quantum dots have an average diameter ranging from 5 nm to 100 nm.

The perovskite quantum dots of the present disclosure may comprise a shell. In embodiments, the shell comprises an oxide (e.g., SiO$_2$, Al$_2$O$_3$, TiO$_2$, ZrO2, ZnO, or a combination thereof), a sulphide (e.g., ZnS, InS, CdS, PbS, or a combination thereof), or a halide (e.g., CsX, NaX, KX, LiX, RbX, MgX2, CaX2, ZnX2, TlX, PbX2, CuX, CuX2, or a combination thereof, wherein X is, at each occurrence, independently Cl, Br, or I).

Perovskite quantum dots may be prepared using any suitable methods. For example, perovskite quantum dots having the formula: CsPbClxBryIz may be formed in accordance with the procedures described in Protesescu, L., et al., Nano Lett., 2015. 15: p. 3692-3696, which is incorporated by reference in its entirety for its teachings regarding the same. In particular embodiments, the perovskite quantum dots have low defects (i.e., halide vacancies), as evidenced by a PLQY near to unity.

The perovskite quantum dots may be treated, for example, to improve stability further, to shift the emission range, or both. Examples of such treatments are described, for example, in Sinatra, L., et al., SID Symposium Digest of Technical Papers, 2019. 50 (1): p. 1712-1715, which is incorporated by reference herein for its teachings regarding the same. In embodiments, a perovskite quantum dot is treated with a ligand having the formula R$_4$N$^+$I$^-$, R$_3$S$^+$I$^-$, R$_4$P$^+$I$^-$, or a combination thereof, wherein each R is, independently, an optionally substituted organic substituent. Thus, in some embodiments, the ligand comprises more than one of R$_4$N$^+$, R$_3$S$^+$, and R$_4$P$^+$. In embodiments, the organic substituent is alkyl, alkenyl, or aryl. In embodiments, the organic substituent is cycloalkyl. In particular embodiments, the organic substituent comprises at least six carbons. In some embodiments, the organic substituent comprises no more than eight carbons. In some such embodiments, the ligand has the formula R$_4$N$^+$I$^-$ or R$_4$P$^+$I$^-$. In some embodiments, the organic substituent is optionally substituted with hydroxyl, oxo, carboxyl, amino, phosphate, sulfonic acid, or a combination thereof. In a specific embodiment, R is [CH$_3$CH [N(CH$_3$)$_3$]-{CH$_2$CH(N(CH$_3$)$_3$]} n-CH$_2$CH$_2$N (CH$_3$)$_3$](n+2)+x (n+2) I", where n is an integer that is at least 1. In another embodiment, R is [CH$_3$CH[P(CH$_3$)$_3$]-{CH$_2$CH (P(CH$_3$)$_3$]}n-CH$_2$CH$_2$P(CH$_3$)$_3$]$^{(n+2)+}$×(n+2)I$^-$, where n is an integer that is at least 1.

In certain embodiments, the ligand comprises tridodecylmethylammonium iodide, Hexadecyltrimethylammonium Iodide, tetra-n-octylammonium iodide, tetrahexylammonium iodide, methyltriphenylphosphonium iodide, tetraphenylphosphonium iodide, trioctylsulfonium iodide, ethyldimethylphenethylammonium iodide, alkyl (C$_8$-C$_{18}$) dimethylbenzylammonium iodide, dialkyl(C$_8$-C$_{18}$) dimethylammonium iodide, trimethylhexadecylammonium iodide, or a combination thereof. In other embodiments, the ligand comprises 2-Butene-1,4-bis(triphenylphosphonium Iodide).

As compared to other quantum dots (e.g., CdSe, InP, etc.), perovskite quantum dots provide several advantages, including narrower FWHM, higher PLQY, facile synthesis process, and broader emission control. In some embodiments, the perovskite quantum dots have a FWHM of less than 25 nm. In further embodiments, the perovskite quantum dots have a FWHM of less than 20 nm. In various embodiments, the perovskite quantum dots have a PLQY of at least 70%. In some embodiments, the perovskite quantum dots have a PLQY of at least 80%. In further embodiments, the perovskite quantum dots have a PLQY of at least 90%. In particular embodiments, the perovskite quantum dots have a PLQY of at least 95%.

As noted above, materials of the present disclosure further comprise an additive comprising (1) a halide-based additive; (2) a light scattering agent having the formula: M$_2$O$_3$, wherein M is, at each occurrence, independently, a metal, provided that at most one instance of M is a group 13 element; or (3) both a halide-based additive and a light scattering agent.

In embodiments, the material comprises the halide-based additive. As used herein, "halide-based additive" refers to a compound that contains a halide ion. In some embodiments, the halide-based additive comprises a bromide containing compound, an iodide containing compound, a chloride containing compound, or a combination thereof. In particular embodiments, the halide-based additive comprises a bromide containing compound. In certain embodiments, the halide-based additive comprises an iodide containing compound. In further embodiments, the halide-based additive comprises at least two of Br, I, and Cl. In some embodiments, the halide-based additive comprises the same halide(s) as the perovskite quantum dots.

In various embodiments, the halide-based additive comprises a metal halide salt, an organic halide salt, or both. In some embodiments, the halide-based additive is a metal halide salt, such as $MgBr_2$, $CaBr_2$, $AlBr_3$, $ZnBr_2$, or a combination thereof. In certain embodiments, the halide-based additive comprises an alkali metal halide, such as LiBr, NaBr, KBr, RbBr, CsBr, or a combination thereof. In other embodiments, the halide-based additive comprises an organic halide salt, such as an ammonium salt, a sulfonium salt, a phosphonium salt, or a combination thereof.

In particular embodiments, the organic halide salt comprises an ammonium salt (e.g., Tetraoctylammonium bromide; Didodecyldimethylammonium bromide; Tetrabutylammonium bromide; Tetraoctylammonium bromide; Hexadecyltrimethylammonium bromide; Trimethyloctadecylammonium bromide; Myristyltrimethylammonium bromide; or a combination thereof). In particular embodiments, the organic halide salt comprises a sulfonium salt (e.g., dimethyl(octyl) sulfonium bromide; (Ethoxycarbonylmethyl)dimethylsulfonium bromide; Sulfonium, dimethyl (2-phenylethyl)-, bromide; Benzyl(diethyl) sulfonium bromide; Sulfonium, dimethyl [1-(4-methylphenyl)ethyl]-, bromide; Sulfonium, [1-(dimethylamino)-4-pentenylidene]-2-propenyl-, bromide; Sulfonium, [1-(dimethylamino)-3-methyl-4-pentenylidene]-2-propenyl-, bromide; or a combination thereof). In particular embodiments, the organic halide salt comprises a phosphonium salt (e.g., Tetrabutylphosphonium bromide; Tetraphenylphosphonium bromide; Tributyl(hexadecyl) phosphonium bromide; Tetraoctylphosphonium bromide; Trihexyltetradecylphosphonium bromide; Dodecyltriphenylphosphonium bromide; Bis (triphenylphosphoniomethyl)benzene dibromide; Benzyltriphenylphosphonium bromide, polymer-bound; or a combination thereof).

In various embodiments, the organic halide salt comprises a phosphonium salt. In certain embodiments, the phosphonium salt comprises a phosphonium bromide salt. In specific embodiments, the phosphonium bromide salt comprises Tetrabutylphosphonium bromide; Tributyl(hexadecyl) phosphonium bromide; Tetraoctylphosphonium bromide; Trihexyltetradecylphosphonium bromide; Dodecyltriphenylphosphonium bromide; Bis(triphenylphosphoniomethyl)benzene dibromide; Benzyltriphenylphosphonium bromide, polymer-bound; or a combination thereof.

In some embodiments, the phosphonium salt comprises a phosphonium iodide salt. In specific embodiments, the phosphonium iodide salt comprises phosphonium iodide-based salt example such as tetraethylphosphonium iodide; tetrabutylphosphonium iodide; tetraphenylphosphonium iodide; tributylmethylphosphonium iodide; tetraoctylphosphonium iodide; methyltriphenylphosphonium iodide; ethyltriphenylphosphonium iodide; Isopropyltriphenylphosphonium iodide; (Iodomethyl)triphenylphosphonium iodide; methyltriphenylphosphonium iodide, polymer-bound; or a combination thereof.

In some embodiments, the phosphonium salt comprises a phosphonium chloride salt. In embodiments, the phosphonium chloride salt comprises tetrabutylphosphonium chloride; tetraphenylphosphonium chloride; tributyl(tetradecyl) phosphonium chloride; tributylmethylphosphonium; tetraoctylphosphonium chloride; trihexyltetradecylphosphonium chloride; dodecyltriphenylphosphonium chloride; triphenylphosphonium chloride, polymer-bound; tributylmethylphosphonium chloride, polymer-bound; or a combination thereof.

In embodiments, the perovskite quantum dots are green emitting and the halide-based additive comprises a phosphonium bromide salt. In some such embodiments, the perovskite quantum dots have the formula: $Cs_a(MA)_b(FA)$-$PbBr_3$. In specific embodiments, the green emitting quantum dots comprise $CsPbBr_3$.

In embodiments, the perovskite quantum dots are blue emitting and the halide-based additive comprises a phosphonium bromide salt and a phosphonium chloride salt. In some such embodiments, the perovskite quantum dots comprise $CsPbCl_xBr_y$, wherein the sum of x and y is 3.

In embodiments, the perovskite quantum dots are red emitting and the halide-based additive comprises a phosphonium bromide salt and a phosphonium iodide salt. In some such embodiments, the perovskite quantum dots comprise $CsPbBr_yI_z$, wherein the sum of y and z is 3. In embodiments, the halide-based additive is present in a concentration of no more than 10%, by weight. In further embodiments, the halide-based additive is present in a concentration of less than 10%, by weight. In some embodiments, the halide-based additive is present in a concentration of no more than 7%, by weight. In some embodiments, the halide-based additive is present in a concentration of less than 7%, by weight. In still further embodiments, the halide-based additive is present in a concentration of no more than 5%, by weight. In particular embodiments, the halide-based additive is present in a concentration of less than 5%, by weight.

In embodiment, the material comprises the light scattering agent. A "light scattering agent" as used herein is a particle that is optically transparent and that has a refractive index that is different from the refractive index of the perovskite quantum dot(s) in the material. As noted above, the light scattering agent has the formula: $M_2O_3$, wherein M is, at each occurrence, independently, a metal, provided that at most one instance of M is a group 13 element. In some embodiments, each occurrence of the metal is, independently, an alkaline earth metal or a transition metal. In certain embodiments, each occurrence of the metal is, independently, an alkaline earth metal. In particular embodiments, each occurrence of the metal is, independently, a transition metal. In specific embodiments, each occurrence of the metal is, independently strontium (Sr), titanium (Ti), calcium (Ca), barium (Ba), zinc (Zn), or yttrium (Y).

In some embodiments, the light scattering agent is a titanate. In some embodiments, the light scattering agent comprises Y.

In specific embodiments, the light scattering agent comprises $SrTiO_3$, $CaTiO_3$, $BaTiO_3$, $ZnTiO_3$, $Y_2O_3$, or a combination thereof.

In certain embodiments, the perovskite quantum dots and additive(s) of the present materials are interspersed in a monomer or a polymer. Accordingly, a material of the present disclosure comprises:
  a monomer or a polymer;
  perovskite quantum dots interspersed in the monomer or the polymer, each of the perovskite quantum dots independently having the formula:

$$Cs_a(MA)_b(FA)_cRb_dPb_pSn_rBi_sCl_xBr_yI_z,$$

wherein:
 MA is $CH_3NH_3$;
 FA is $HC(NH_2)_2$;
 a, b, c, and d are each independently a number from 0 to 1, provided that the sum of a, b, c, and d is 1;
 p, r, and s are each independently a number from 0 to 1, provided that the sum of p, r, and s is 1; and
 x, y, and z are each independently a number from 0 to 3, provided that the sum of x, y, and z is 3; and
 an additive interspersed in the monomer or the polymer, the additive comprising:
  a halide-based additive;
  a light scattering agent having the formula: $M_2O_3$, wherein M is, at each occurrence, independently, a metal, provided that at most one instance of M is a group 13 element; or
  both.

Suitable monomers for use in the materials described herein include urethanes, vinyl chloride, vinyl monomers, esters, acrylates, amides, olefins, thermoplastic elastomers, styrene block monomers, ether block amides. Suitable polymers for use in the materials of the present disclosure include polyurethanes, rubbers, polyvinylchloride (PVC), vinyl polymers, polyesters, polyacrylates, polyamides, biopolymers, polyolefins, thermoplastic elastomers, styrene block copolymers, polyether block amides, or a combination thereof. In some embodiments, the rubber is a silicon rubber, a latex rubber, or a combination thereof. In embodiments, the polymer is a polymer resin.

In various embodiments, the monomer or polymer is non-polar. In some embodiments, the monomer or polymer is ultra-violet (UV) curable. In some embodiments, the polymer comprises a mixture of acrylate and styrene-based polymers. In certain embodiments, the polymer does not comprise-epoxy, hydroxyl (—OH), amine (—$NH_2$), carboxyl (—COOH) group(s).

The mixture of the perovskite quantum dots, additive(s) and monomer or polymer is referred to as a composite.

In various embodiments, the composite comprises additional additive(s). For example, in embodiments, the composite comprises a photoinitiator, an adhesive, a viscosity modifier, or a combination thereof. In particular embodiments, the viscosity modifier comprises $SiO_2$ nanoparticles. In specific embodiments, the photoinitiator comprises 2,2-Dimethoxy-2-phenylacetophenone, Phenylbis(2,4,6-trimethylbenzoyl) phosphine oxide, 2-Hydroxy-2-methylpropiophenone, or a combination thereof. In particular embodiments, the adhesive comprises Loctite 3195.

In some embodiments, the material is a liquid.

In other embodiments, the material is solid. In some embodiments, the composite of the material is formed as a film. In embodiments where the composite is in the form of a layer (e.g., a film), the total thickness of the composite ranges from 1 micrometer (μm) to 1000 μm. In some such embodiments, the film further comprises barrier layer(s) arranged on one or both sides of the composite. In particular embodiments, barrier layers are arranged on both sides of the composite. Such barrier layers protect provide additional protection for the composite from the environment (e.g., air and moisture).

Barrier layers may comprise any suitable transparent material. For example, suitable barrier layers comprise a polymer film, glass, or both. In some embodiments, the barrier layer(s) comprise a polymer film. In certain embodiments, the barrier layer(s) comprise a multilayer polymer film. In some such embodiments, the multilayer polymer film comprises an inorganic layer. In specific embodiments, the inorganic layer comprises $Al_2O_3$, $SiO_2$, or both. In particular embodiments, the barrier layer(s) comprise glass. In various embodiments, the barrier layer has a water vapor transmission rate (WVTR) of about <0.001 $g/m^2$-day at 20° C. In various embodiments, the barrier layer has a WVTR of about <0.1 $g/m^2$-day at 20° C.

In some embodiments, the barrier layer has a thickness ranging from 1 μm to 100 μm. In further embodiments, the barrier layer has a thickness ranging from 25 μm to 100 μm. In particular embodiments, the barrier layer has a thickness of about 50 μm.

In various embodiments, a film of the present disclosure has a thickness ranging from 1 μm to 1000 μm. In some embodiments, the film has a thickness ranging from 100 μm to 500 μm. In particular embodiments, the film has a thickness of about 200 μm.

In embodiments, a material of the present disclosure further comprises emissive particles. In some embodiments, the emissive particles are red emissive particles. In some embodiments, the emissive particles comprise narrow band phosphors, narrow band quantum dots, or both. In particular embodiments, the narrow band phosphor comprises a rare-earth phosphors (e.g., $Mn^{4+}$-doped $K_2SiF_6$ (KSF:Mn)). In certain embodiments, the narrow band quantum dots comprise CdSe, CdSe/ZnS, CdSe/ZnSe, CdSe/CdS, InP, InP/ZnS, InP/ZnSe, $CuInS_2$, or a combination thereof.

Traditional materials comprising perovskite quantum dots may be unstable when operating outside of optimal conditions. Due to the ionic structure, perovskite quantum dots may be susceptible to degradation when exposed to conditions (e.g., moisture, heat, light irradiation, etc.) outside of optimal ranges. Under such conditions, the perovskite quantum dots may lose their optical properties, such as a decrease in PLQY and broadening of the FWHM. Advantageously, the materials described herein provide improved stability of the perovskite quantum dots when exposed to conditions outside of the optimal ranges. For example, the materials of the present disclosure sustain their photoluminosity under high temperature conditions (e.g, up to 100° C.), high humidity (e.g., up to 90% relative humidity (RH)), and high light exposure. Thus, the disclosed materials are suitable for use in various devices.

Materials of the present disclosure can be used in various devices, for example, a display device, a lighting device, an ultraviolet detector, an x-ray scintillator, or a gamma-ray scintillator. Accordingly, provided herein are devices comprising a material (e.g., as an emissive layer) described herein.

In various embodiments, a material described herein is used in a display device. In some such embodiments, a display device comprises a material as described herein and a light source that emits first wavelength(s) of light. In some embodiments, the first wavelength(s) of light are blue, UV, blue with red, or UV with blue and red. Advantageously, a display device of the present disclosure provides improved color representation and extended color gamut coverage. In embodiments, a material of the present disclosure is used in liquid crystal display (LCD) backlighting, LCD color filters, or light emitting diode (LED) color filters (e.g. organic LED (OLED) or microLED color filters). In embodiments, the device comprises an LED. In some such embodiments, the material is a film arranged on the LED. In particular embodiments, the device comprises an OLED. In some such embodiments, the material is a film arranged on the OLED. In some embodiments, the device comprises a microLED. In some such embodiments, the material is a film arranged on the microLED.

Figure 1A:
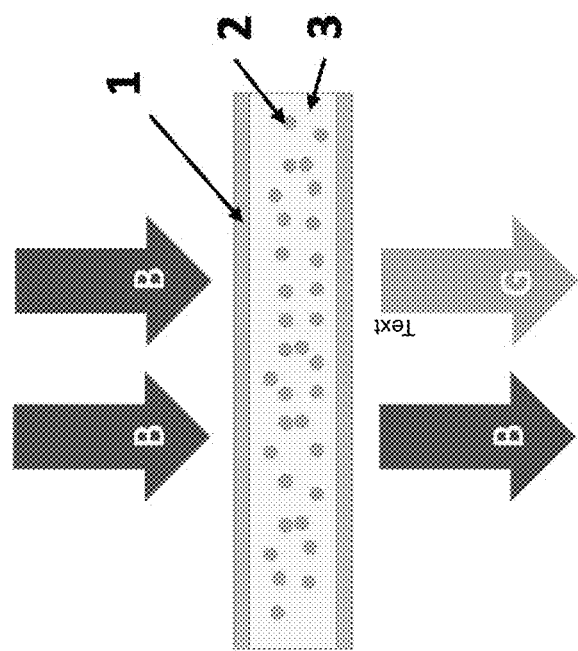
FIG. 1A shows a graphic representation of a film of the present disclosure and schematic of its working principle as a light down conversion layer.

In embodiments, the device comprises an LCD. In some embodiments, a material of the present disclosure is used as color converters in an LCD device. In some embodiments, the materials are used to down-convert the color (e.g., from blue light to green light, from blue light to red light, or both) in an LCD device. Schematics of exemplary down conversion layers and the related working principles are provided in FIG. 1A and FIG. 1B. FIG. 1A shows a graphic representation of green emissive quantum dots 2 embedded in a polymer 3 with barrier layers 1 on both sides. The film is exposed to blue light and emits green and blue light. FIG. 1B shows a graphic representation of green emissive quantum dots 2 and red emissive quantum dots 8 embedded in a polymer 3 with barrier layers 1 on both sides. The film is exposed to blue light and emits red, green, and blue light.

In further embodiments, the materials can be used in other color filter applications. In certain embodiments, the material is used in display backlighting and comprises perovskite quantum dots in a concentration ranging from 0.3% to 0.5%, by weight, and a thickness ranging from 100 µm to 500 µm.

In various embodiments, a material of the present disclosure is formed as a film, which is arranged between a light source and an LCD matrix. In alternate embodiments, a material of the present disclosure is formed as pixel sized composites on an LCD matrix.

Figure 2A:
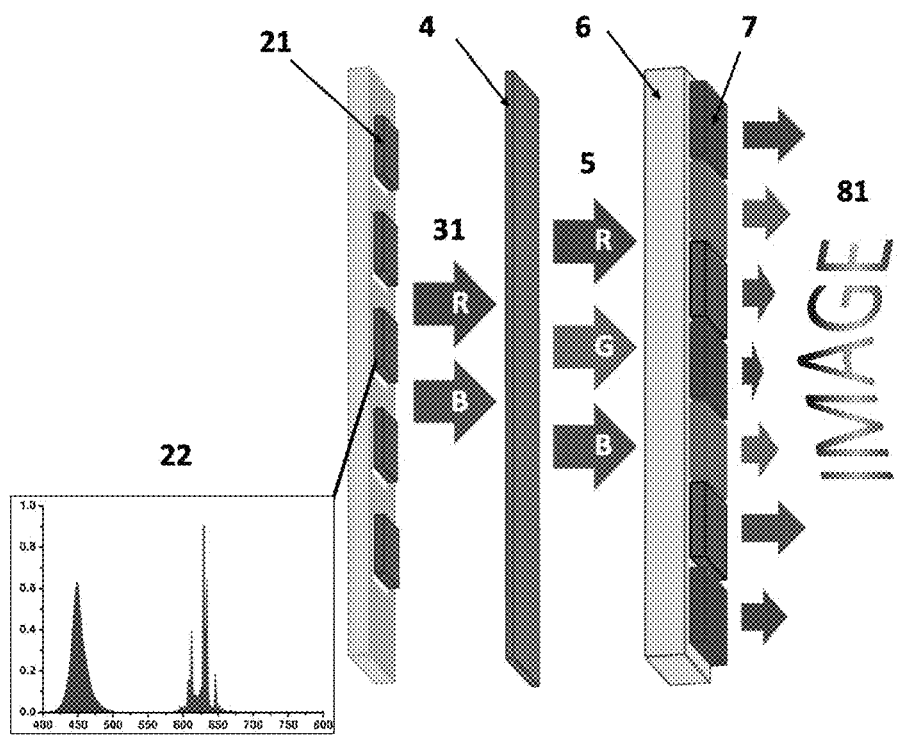
FIG. 2A and FIG. 2B show embodiments of display devices that each comprising a film of the present disclosure.

A particular embodiment of a display device comprising a film of the present disclosure is illustrated in FIG. 2A. The film 4 comprises composite with quantum dots (e.g., $CsPbBr_3$) is arranged between a light source 21 and an LCD matrix 6. The light source 21 is a pink LED, which emits red (630 nm) and blue (450 nm) light 31 as shown in the spectrum 22. The material 4 down coverts a portion of the blue light from the light source 21 that has an emission center greater than 524 nm and a FWHM less than 25 nm. The red emissions would pass through the film. The red, greed and blue emissions 5 then pass through the LCD matrix 6 and color filters 7, giving the image 81. In embodiments, this configuration allows for greater than 90% of Rec.2020 coverage.

Figure 2B:
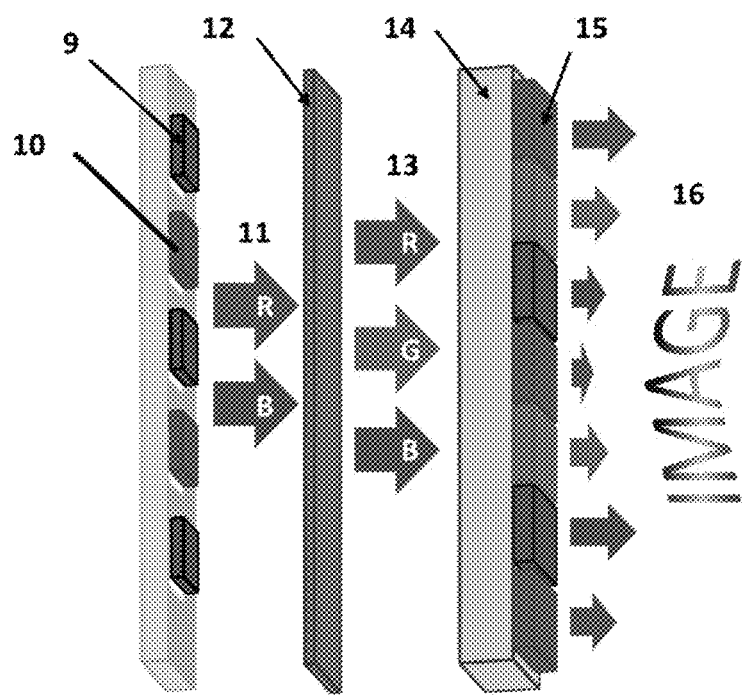

A further embodiment of a display device comprising a film of the present disclosure is illustrated in FIG. 2B. The film 12 comprises composite with $CsPbBr_3$ quantum dots is arranged between a light source and an LCD matrix. The light source comprises red LED 10 and blue LED 9, which emits red (630 nm) and blue (450 nm) light 11. The material 12 down converts a portion of the blue light from the light source and the red emissions pass through the film. The resulting red, green, and blue emissions 13 then pass through the LCD matrix 14 and color filters 15, giving the image 16.

Figure 3:
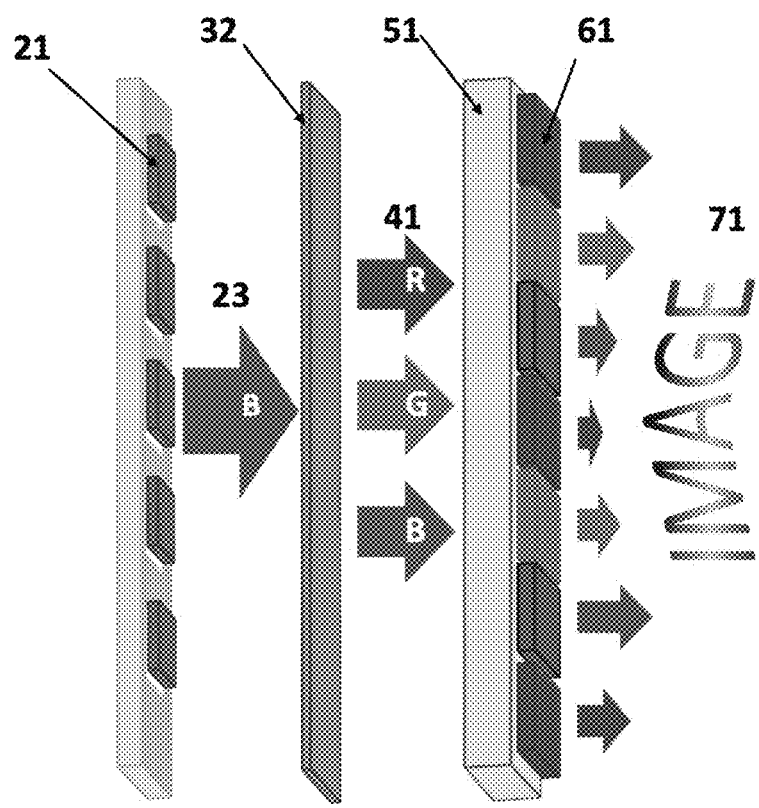
FIG. 3 shows another embodiment of a display device comprising a film of the present disclosure.

Another embodiment of a display device comprising a film of the present disclosure is illustrated in FIG. 3. The film 3 comprises a composite with a mixture of $CsPbBr_3$ quantum dots and red emissive particles (e.g., CdSe quantum dots or KSF-Mn phosphors) arranged between a blue LED light source 21 and an LCD matrix. The film 32 down converts a portion of the blue light 23 and emits red light and green light with an emission center greater than 524 nm and FWHM less than 25 nm. The resulting red, green and blue light 41 then passes through the LCD matrix 51 and color filters 61, resulting in the image 71. In embodiments, this configuration allows for greater than 90% of Rec.2020coverage. A similar configuration could be used with a blue organic LED (OLED) or microLED.

Figure 4A:
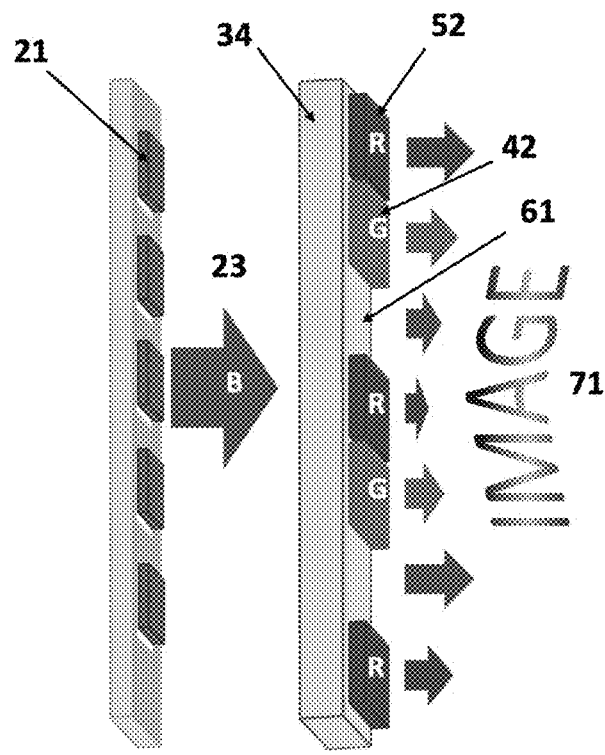
FIG. 4A and FIG. 4B show embodiments of display devices comprising materials of the present disclosure.

A further embodiment of a display device of the present disclosure is illustrated in FIG. 4A. An LED light source 21 emits blue light 23, which first passes through the LCD matrix 34 and then a material of the present disclosure. Such materials are arranged as a plurality of pixel sized films comprising $CsPbBr_3$ quantum dots 42. The pixel sized films 42 convert blue light into green light with emission greater than 524 nm and FWHM less than 25 nm. Additional composites comprising red emissive particles are arranged in pixel sized films 52. A portion of the light passes through the pixel sized films 42, a portion of the light passes through the pixel sized films 52, and a portion passes without any color filter 61. Thus, red, green, and blue light forms the image 71. Depending on the red emissive particles type, it is possible to achieve greater than 90% or 95% of Rec.2020 coverage. A similar configuration could be used with a blue OLED or microLED.

Figure 4B:
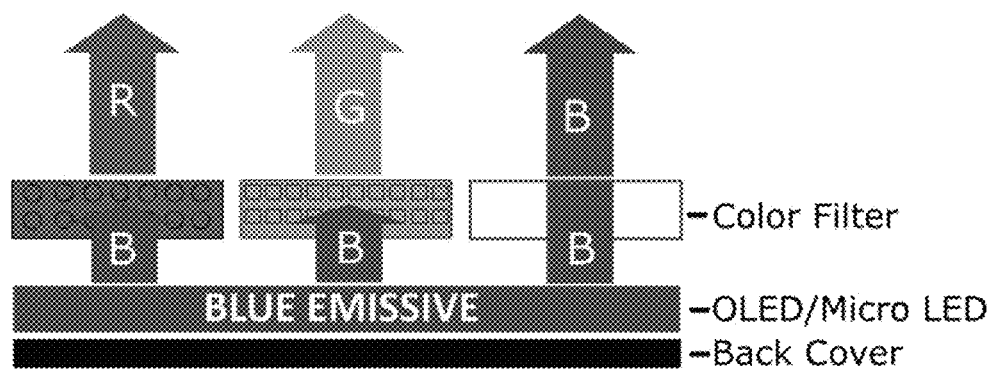

A further embodiment of a display device of the present disclosure is illustrated in FIG. 4B. An OLED or microLED light source emits blue light, which passes through a color filter, a first material of the present disclosure, or a second material of the present disclosure. The first material converts blue light into green light and the second material converts blue light into red light. Thus, red, green, and blue light forms the resulting image.

Figure 5:
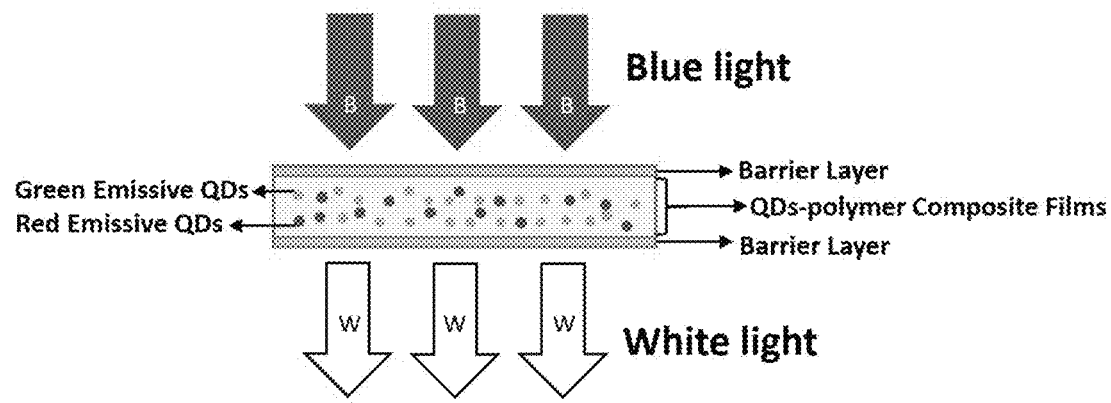
FIG. 5 is an illustration of an embodiment of a lighting device of the present disclosure.

In alternate embodiments, the materials of the present disclosure are used in lighting devices (e.g., LED based lamps). For example, a material of the present disclosure could be incorporated into existing lighting technology in order to facilitate a more energy efficient lighting source with a tunable emission spectrum. A material of the present disclosure could be used to convert a portion of blue light emitted from a light source into red and/or green light using red and/or green emissive perovskite quantum dots, respectively. In particular combinations, blue light passed through a material of the present disclosure provides a combination of red, green, and blue light that provides a white color spectrum. An embodiment of a lighting device of the present disclosure is illustrated in FIG. 5. In embodiments, the materials of the present disclosure may alternatively be used in quantum dot-on chip technologies.

Figure 6:
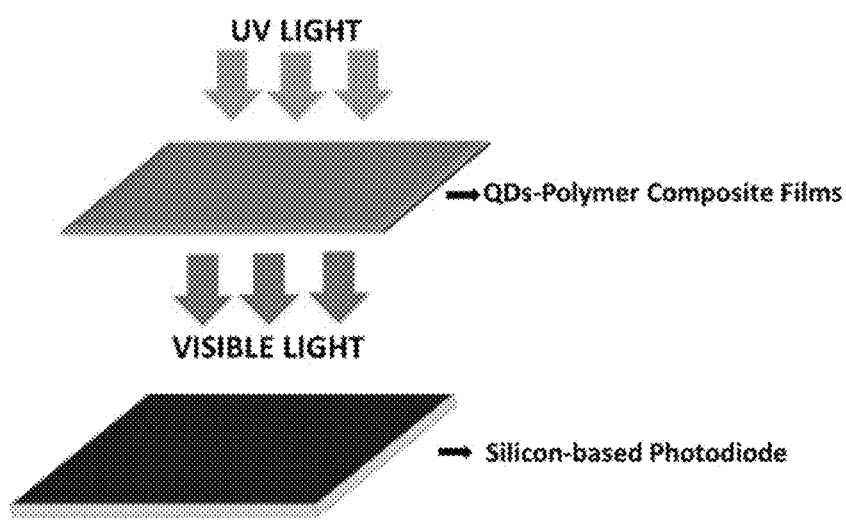
FIG. 6 is an illustration of an embodiment of a UV detector of the present disclosure.

In further embodiments, the materials of the present disclosure are used in UV detectors. Commercially available photodiodes are generally based on silicon and indium gallium arsenide, which is typically only sensitive to light in the visible or near infrared range. In other words, such photodiodes have low responsivity for wavelengths of light below 400 nm. Advantageously, a material of the present disclosure may be used to convert UV light to visible light, which can then be detected by a photodiode with better responsivity. An embodiment of a UV detector of the present disclosure is illustrated in FIG. 6.

Figure 7:
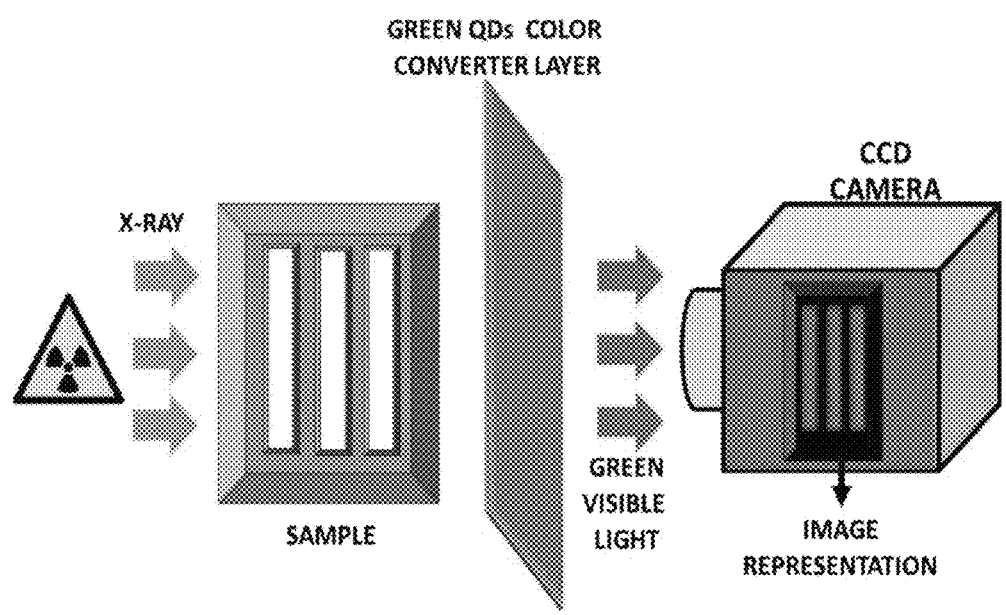
FIG. 7 is an illustration of an embodiment of an x-ray scintillator system of the present disclosure.

In further embodiments, the materials of the present disclosure are used in x-ray scintillators (e.g., for medical, security, or commercial diagnostics). Perovskite quantum dots are sensitive to x-rays and can convert x-rays to visible light. Thus, materials of the present disclosure can be used in x-ray scintillator systems. Advantageously, the materials of the present disclosure are solution processable and have tunable emissions. An embodiment of an x-ray scintillator of the present disclosure is illustrated in FIG. 7.

In order to confirm that a material is suitable for use in such devices, accelerated testing may be performed. For example, high-temperature accelerated testing may be conducted using the following procedure. First, the film is heated to a temperature of 85° C. at 60% of RH and irradiated with blue light (450 nm) at a power of 10 mW/cm². During the accelerated testing, the emission intensity of the film is monitored periodically.

Figure 8A:
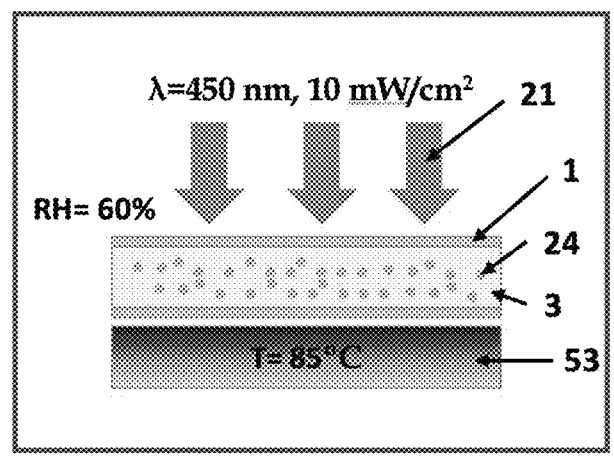
FIG. 8A shows a schematic of a high-temperature testing method.

A schematic of such testing is shown in FIG. 8A. The film, comprising a composite that includes a polymer resin 3, perovskite quantum dots 24, and barrier layers 1, is arranged adjacent to a heat source 53 while irradiated by a light source 21.

Further, high-flux accelerated testing may be conducted using the following procedure. First, the film is heated to a temperature of 60° C. at 60% of RH and irradiated with blue light (450 nm) at a power of 100 mW/cm². During the accelerated testing, the emission intensity of the film is monitored periodically.

Figure 8B:
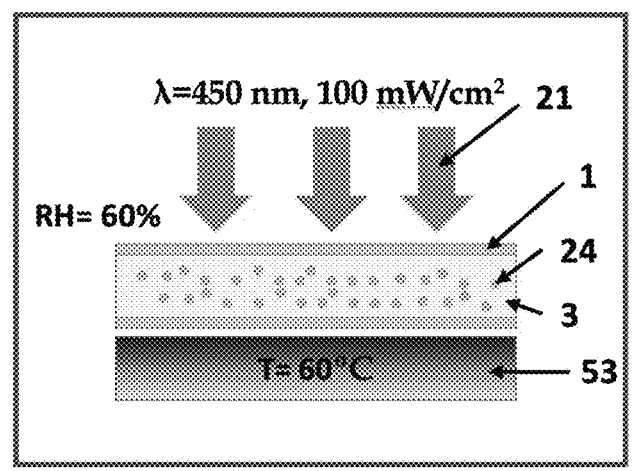
FIG. 8B shows a schematic of a high-flux testing method.

A schematic of such testing is shown in FIG. 8B. The film, comprising a composite that includes a polymer resin 3, perovskite quantum dots 24, and barrier layers 1, is arranged adjacent to a heat source 53 while irradiated by a light source 21.

In embodiments, the materials of the present disclosure retain at least about 70% of the initial emission intensity after 1000 hours of exposure. In some embodiments, the materials of the present disclosure retain at least about 80% of the initial emission intensity after 1000 hours of exposure.

The materials of the present disclosure can be made using any suitable methods. Methods of forming the materials of the present disclosure comprise mixing perovskite quantum dots and the additive (i.e., a halide-based additive, a light scattering agent having the formula: $M_2O_3$, wherein M is, at each occurrence, independently, a metal, provided that at most one instance of M is a group 13 element, or both) with a monomer or a polymer (e.g., a polymer resin). In some embodiments, a first mixture is formed by mixing the perovskite quantum dots and the monomer or the polymer, and a second mixture is formed by mixing the first mixture with the additive. In other embodiments, a first mixture is formed by mixing the additive and the monomer or the polymer, and a second mixture is formed by mixing the first mixture with the perovskite quantum dots. In embodiments, the method comprises mixing a halide-based additive into a composite of (a) the monomer or polymer and (b) the perovskite quantum dot(s). In some embodiments, the method comprises mixing a light scattering agent into a composite of (a) the monomer or polymer and (b) the perovskite quantum dot(s). In embodiments, the method comprises mixing perovskite quantum dot(s) into a composite of (a) the monomer or polymer and (b) the halide-based additive. In some embodiments, the method comprises mixing perovskite quantum dot(s) into a composite of (a) the monomer or polymer and (b) a light scattering agent.

Once mixed, the material can be shaped, e.g., to form a film, using any suitable method. For example, the material may be blade coated, drop casted, printed, or the like. Accordingly, described herein are methods for forming a film comprising a material of the disclosure, the method comprising: spreading a material described herein; and forming the film by curing the material. In some embodiments, the material is spread by blade coating. In other embodiments, the material is spread by drop casting. In further embodiments, the material is spread by printing. In some embodiments, the material is spread onto a barrier layer. In some embodiments, curing the material comprises exposing the material to UV light (e.g., at an intensity of about 800 mW/cm²). In some embodiments, the methods for forming the film comprise forming a composite by mixing the monomer or the polymer and the perovskite quantum dots; spreading the composite; and forming the film by curing the composite.

Figure 9:
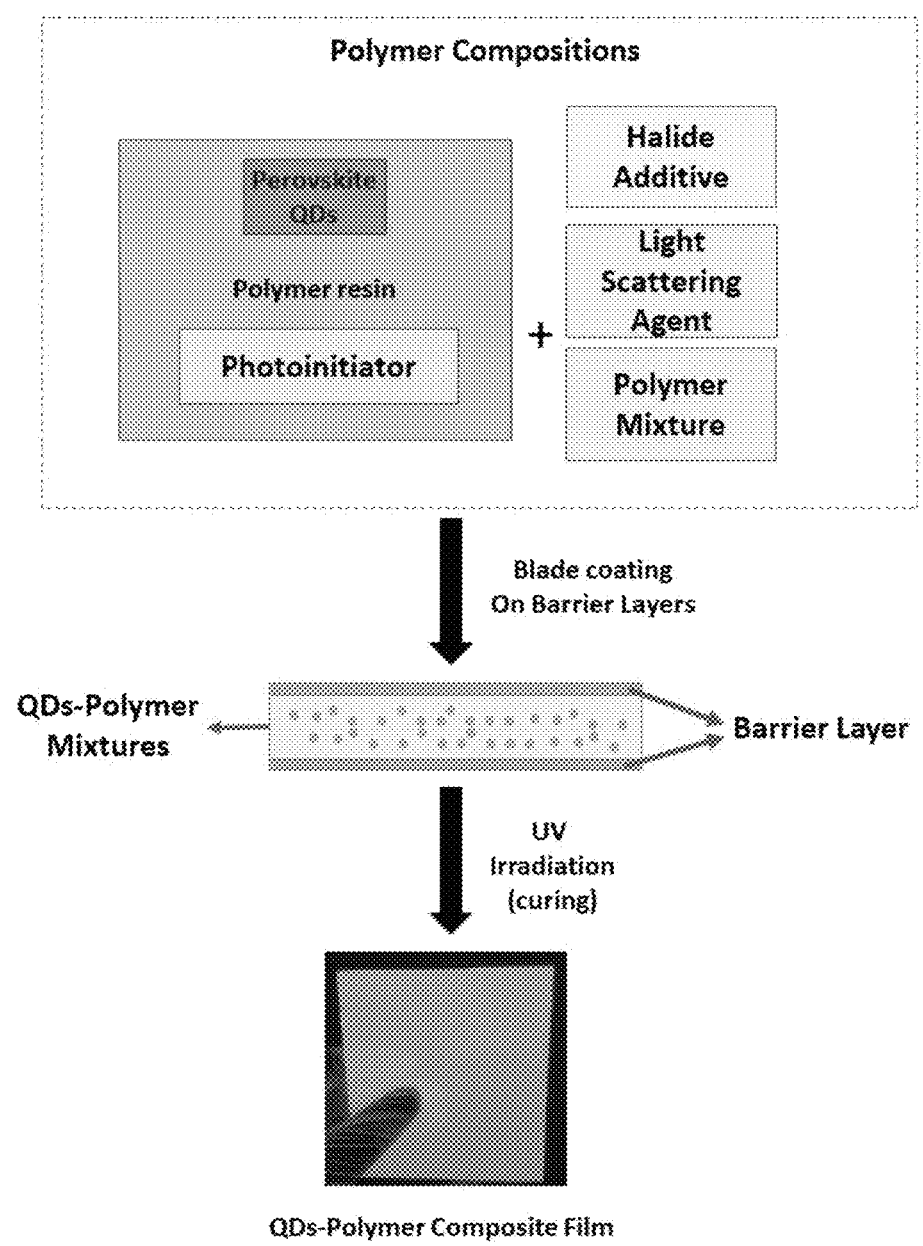
FIG. 9 shows a schematic of an exemplary method of the disclosure.

FIG. 9 shows a schematic of an exemplary process of forming a film of the disclosure. In this example, perovskite quantum dots are mixed with a polymer resin and a photoinitiator. A halide-based additive and a light scattering agent are then added to the resulting mixture. The composition is then blade coated onto barrier layers to provide a layered structure in which the composition is arranged between two barrier layers. Finally, the layered structure is UV irradiated to cure the polymer resin.

EXAMPLES

Example 1

Ligand Comparison $CsPbBr_3$ quantum dots were synthesized by a modified hot-injection procedure as described in Protesescu, L., et al., Nano Lett., 2015. 15: p. 3692-3696. $PbBr_2$ in 1-octadecene (ODE) was loaded in a flask and dried under vacuum at 120° C. Then, oleic acid and oleylamine were injected. After the precursors were in solution, the temperature was raised to 150-200° C., and quantum dots were formed by the quick addition of Cs oleate solution. After five seconds, the reaction was cooled down with an ice-water bath. The crude solution was centrifuged, and the precipitate was redispersed in toluene for further study. For treatment with an additive, a different organic halide source was added to the quantum dots in toluene as a post-treatment synthesis step. The effect of the post-treatment step to the stability of quantum dots at elevated temperature was compared.

In this example, the effect of different post-treatment on the $CsPbBr_3$ quantum dots stability under high temperature was compared. The synthesized quantum dots were treated with different organic halide-based additive. As a comparator, quantum dots were also treated with Didodecyldimethylammonium bromide (DDAB). For this measurement, the quantum dots solutions are drop casted on a glass substrate and allowed to dry before performing the measurement. Under temperature dependent photoluminescence measurement, the quantum dots films samples were subjected to the increase/decrease of certain temperature steps while the photoluminescence intensity was measured and recorded. Using this technique, the effect of the treatment on the quantum dots stability were compared by comparing the stability of the photoluminescence Intensity at certain elevated temperature cycles.

Figure 10:
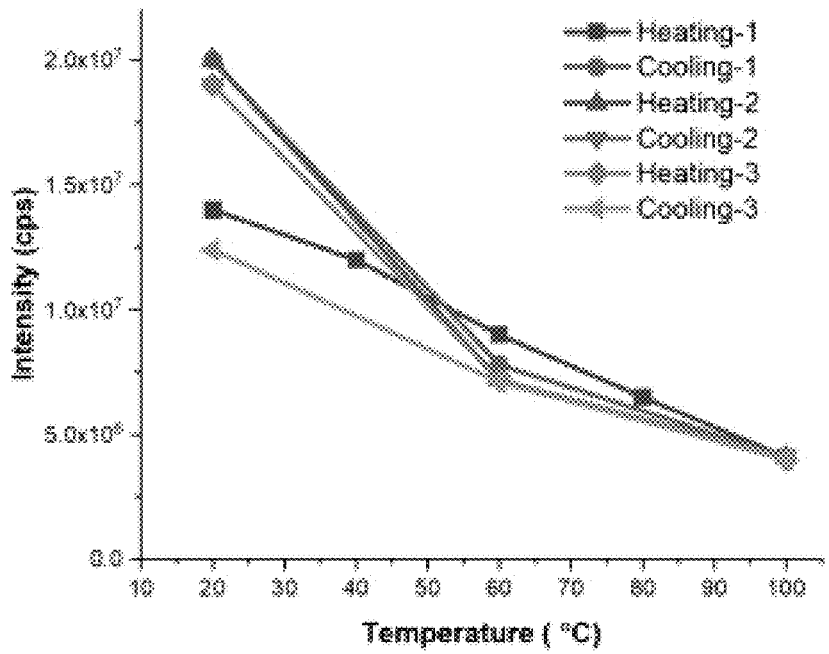
FIG. 10 shows, in graphs (a)-(d), the temperature dependent photoluminescence results of drop-casted films and their comparison before and after treatment with different organic halide source.
Figure 10:
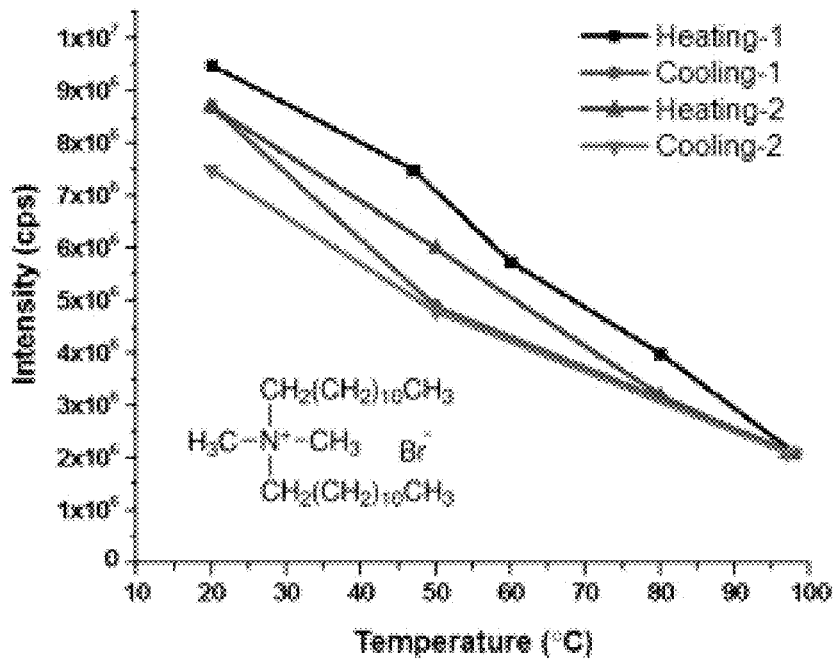
Figure 10:
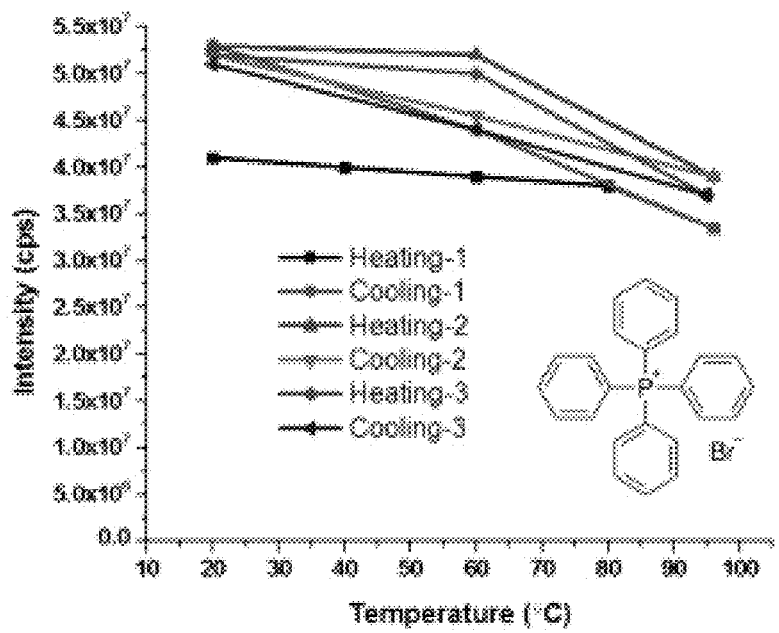
Figure 10:
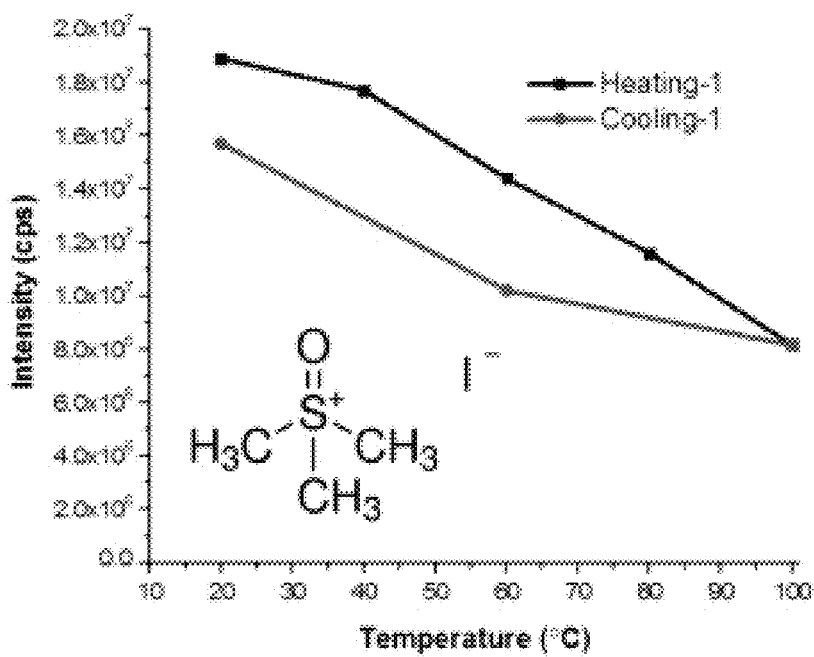

As shown in FIG. 10 (a), at 100° C., quantum dots without additive treatment maintain only 25% of their initial photoluminescence intensity. By repeating the cycle of heating and cooling the quantum dots films, it is also clear that the quantum dots films are not stable as the photoluminescence intensity at 20° C. has dropped as compared to the initial intensity after 3 cycles of heating/cooling.

Similarly, treatment with DDAB did not improve the stability under the elevated temperature condition (FIG. 10 (b)). At 100° C., this sample maintained only 25% of its initial intensity.

Surprisingly, treatment with tetraphenylphosphonium bromide (TPPB) significantly improved the stability of the quantum dots films under elevated temperature condition (FIG. 10 (c)). At 100° C., this sample maintained about 80% of the initial intensity at 20° C. Additionally, the photoluminescence intensity was also stable and actually increased after 3 cycles of heating/cooling the sample.

From FIG. 10 (d), it can be seen that the quantum dots treated with trimethylsulfoxonium iodide show better stability at high temperature as compared to the quantum dots without treatment. This sample maintained 50% of its initial intensity at 100° C. but the photoluminescence at 20° C. dropped directly after only 1 cycle of heating.

From this comparison, phosphonium halide treatment showed the best performance in term of passivating the quantum dots and improving the stability of the quantum dots under high temperature condition for long-term use.

Figure 11:
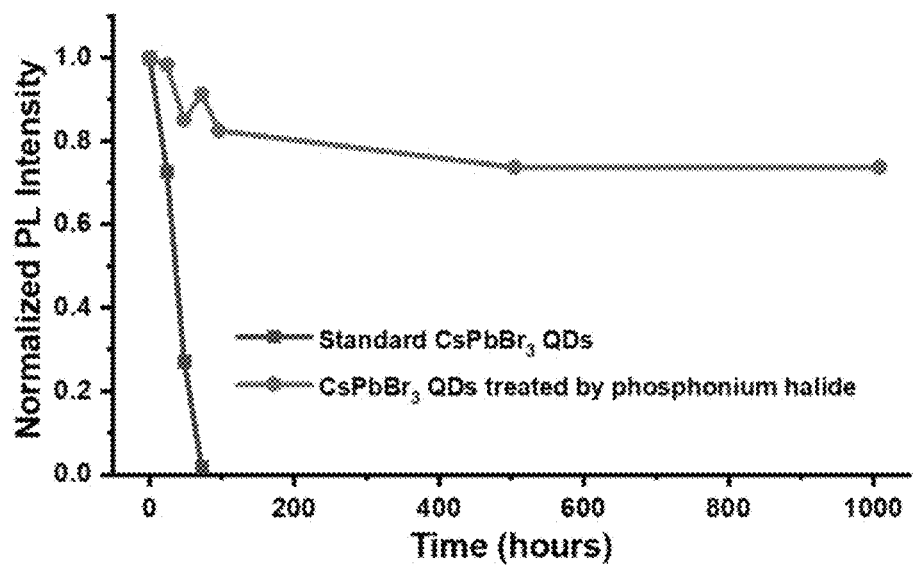
FIG. 11 shows comparative results of normalized photoluminescence intensity recorded during the high temperature accelerated test of films comprising pristine $CsPbBr_3$ quantum dots and phosphonium halide-treated quantum dots.

The stability of films comprising quantum dots having undergone these treatments under high temperature test was also compared. To make the films, the $CsPbBr_3$ quantum dots were dispersed in a mixture of acrylate monomer and oligomer, a photoinitiator, and light scattering particles. The concentration of quantum dots was maintained at 0.5%, by weight. The resulting composition was mixed well and coated between barrier layers. The coated barrier layers were then cured under high intensity UV irradiation to form a solid film. The performance of the resulting films was compared. The results, provided in FIG. 11, show that the phosphonium halide treated quantum dots have significantly improved stability.

Example 2

Use of an Organic Halide as an Additive in Polymer Films

The impact of including organic halides as additives in films on the stability of the films was tested.

The films in this Example were formed by dispersing the treated $CsPbBr_3$ quantum dots in a mix of resins comprising Isobornyl acrylate monomer (IBOA), a photoinitiator, $TiO_2$ nanoparticles as a light scattering agent, and $SiO_2$ nanoparticles as viscosity modifier. The concentration of quantum dots was kept at 0.5%, by weight. Then, in an organic bromide salt was added to the polymer mixture as an additive as indicated. The quantum dots-polymer mixtures were coated between barrier layer films and cured under high intensity UV irradiation to form solid films. The performance of the various films was assessed.

Figure 12:
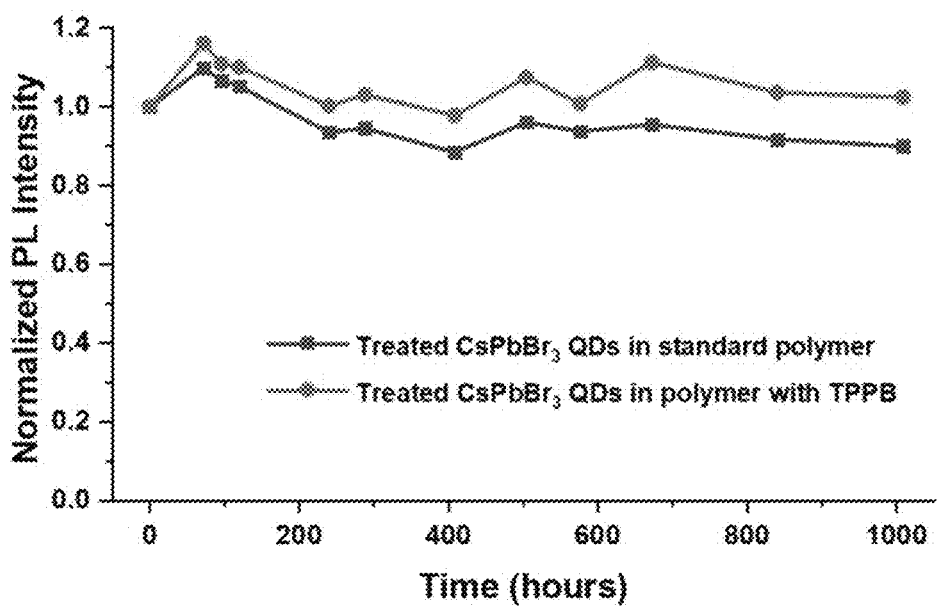
FIG. 12 shows comparative results of normalized photoluminescence intensity recorded during the high temperature accelerated test of the films prepared with additive and without additive.

The films were exposed to high temperature accelerated reliability test. During the accelerated test, the emission intensity of the films was measured and compared. In this study tetaphenylphosphonium bromide (TPPB) was used as an additive. FIG. 12 shows the comparison of the emission intensity during the high temperature accelerated test. Both films maintained >70% of the initial intensity after 1000 hours under the high temperature accelerated test conditions. The film with the additive has shown better stability, and maintained the same emission intensity as the initial intensity before the test.

Figure 13:
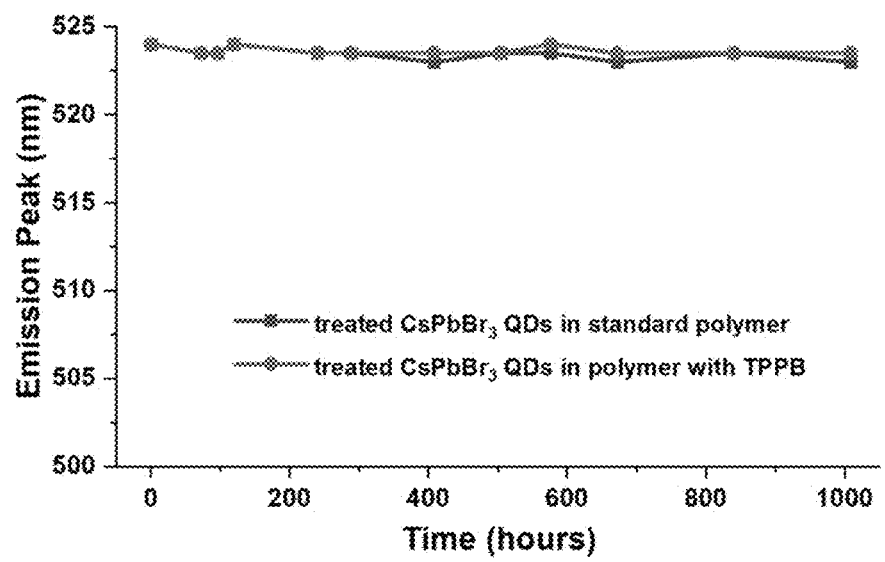
FIG. 13 shows the emission peaks recorded during the high temperature accelerated test of the films with additive and without additive.

The emission peaks of the films was also measured and compared during the high temperature accelerated testing. As shown in FIG. 13, the films with the phosphonium bromide additive maintained slightly better emission peak stability during the high temperature accelerated testing as compared to the films without the additive.

Example 3

High Flux Testing

Figure 14:
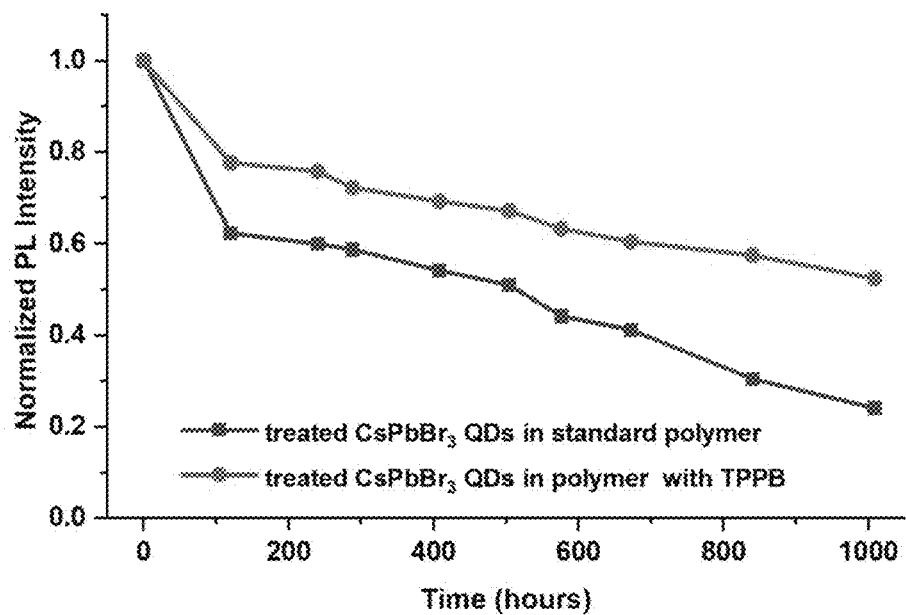
FIG. 14 shows normalized photoluminescence intensity recorded during the high flux accelerated test of the films with additive and without additive.
Figure 15:
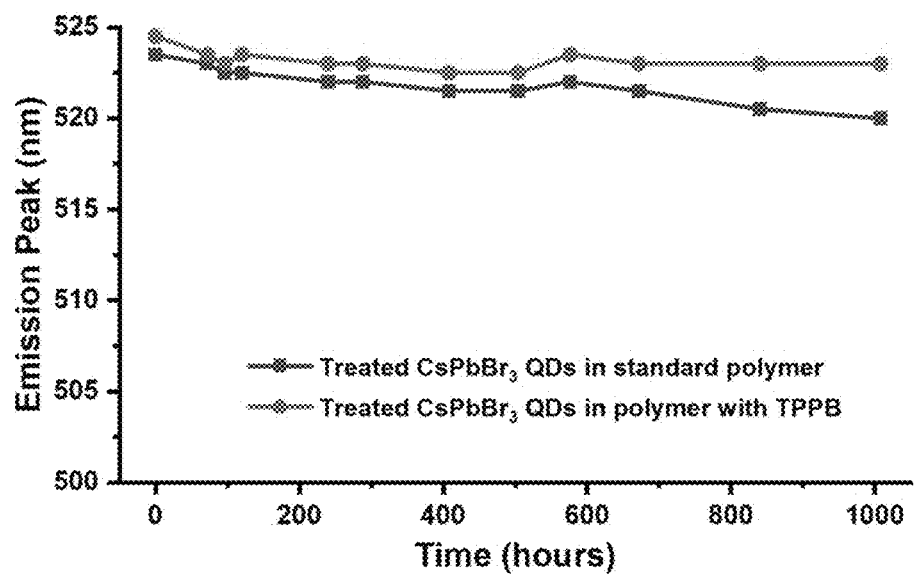
FIG. 15 shows the emission peaks recorded during the high flux accelerated test of the films with additive and without additive.

The films of Example 2 were exposed to high flux accelerated reliability testing. During the accelerated testing, the emission intensity of the films was measured and compared. FIG. 14 shows the comparison of the emission intensity. As shown in FIG. 14, the films with the phosphonium bromide additive (i.e., TPPB) have better stability under high flux condition compared to those without the additive. The films with the phosphonium bromide additive maintained 60% of the initial intensity. Analysis of the emission peak position recorded during the test also confirm that the additive helps to maintain the emission peak stability, as shown in FIG. 15.

Example 4

Different Types of Organic Bromide Salt Additives

In this Example, the use of different types of organic bromide salts as an additive in the polymer to improve stability of the films under high flux test was investigated. The films in this Example were formed by dispersing the treated $CsPbBr_3$ quantum dots in a mix of resins comprising IBOA, a photoinitiator, $TiO_2$ nanoparticles as a light scattering agent, and $SiO_2$ nanoparticle as viscosity modifier. The concentration of quantum dots was maintained at 0.5%, by weight. Additionally, different phosphonium bromide salts were added to the polymer mixture as an additive. The following organic bromide were tested: Tetraphenylphosphonium bromide salts (TPPB), trihexyltetradecylphosphonium bromide (THTDPB), Dodecyltriphenylphosphonium bromide (DTPPB), and Didodecyldimethylammonium bromide (DDAB). Then, the polymer mixture was coated between barrier layers and cured under high intensity UV irradiation to form a solid film.

Figure 16:
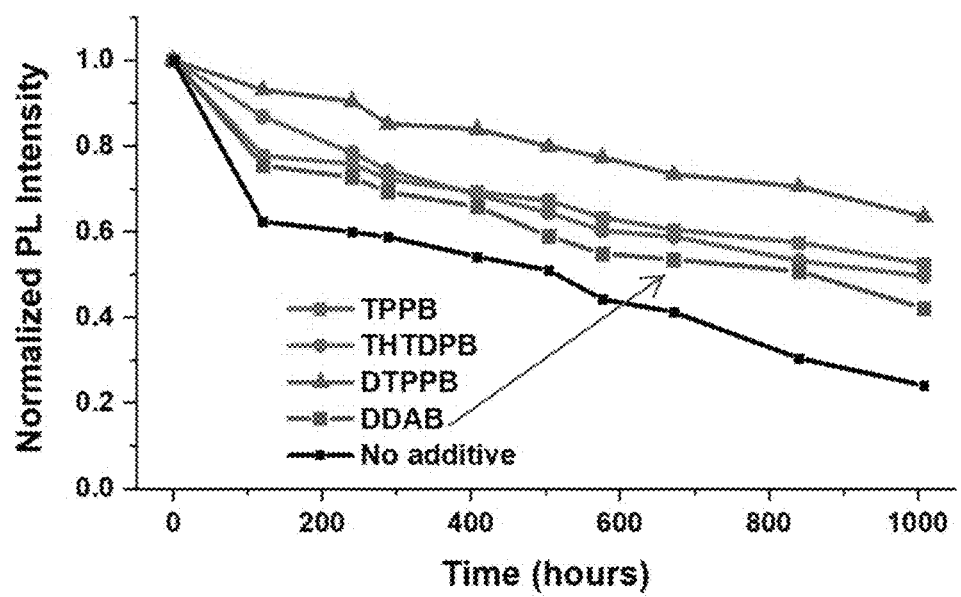
FIG. 16 shows normalized photoluminescence intensity recorded during the high flux accelerated test of the films with different types of additive.

The performance of the films was compared by exposing the films to a high flux accelerated reliability test. During the accelerated test, the emission intensity of the films was measured and compared. FIG. 16 shows the comparison of the emission intensities during the test. DTPPB was shown to provide better stability as compared to the other organic bromide additives tested, while maintaining close to 70% of the initial intensity.

Example 5

Light Scattering Particles

Figure 17:
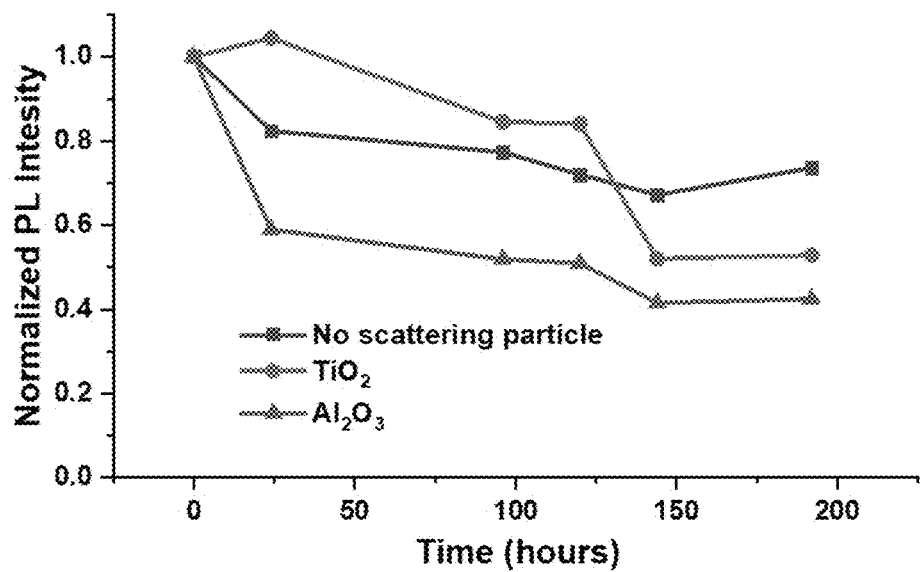
FIG. 17 shows normalized photoluminescence intensity recorded during the high flux accelerated test of the films with various light scattering particles, $TiO_2$ and $Al_2O_3$.

This Example investigates the effect of different types of light scattering nanoparticles on the stability of films under the high flux accelerated test. It was determined that the typical light scattering particles used, such as $TiO_2$ and $Al_2O_3$, are not compatible with $CsPbBr_3$ quantum dots. As shown in FIG. 17, films with $TiO_2$ and $Al_2O_3$ as a light scattering particle degrade faster as compared to films without such scattering particles.

To solve this problem, different types of light scattering nanoparticles were investigated to replace conventional $TiO_2$ or $Al_2O_3$ nanoparticles. The $CsPbBr_3$ quantum dots were synthesized by the same method described in Example 1. The films in this Example were formed by dispersing the treated $CsPbBr_3$ quantum dots in a mix of resins comprising IBOA, a photoinitiator, and $SiO_2$ nanoparticles. The concentration of quantum dots was maintained at 0.5%, by weight. The different types of light scattering nanoparticles used included $TiO_2$, $SrTiO_3$, $CaTiO_3$, $BaTiO_3$, $ZnTiO_3$, and $Y_2O_3$. The resin mixtures with the different light scattering nanoparticles were coated between barrier layers and cured under high intensity UV irradiation to form solid films.

Figure 18:
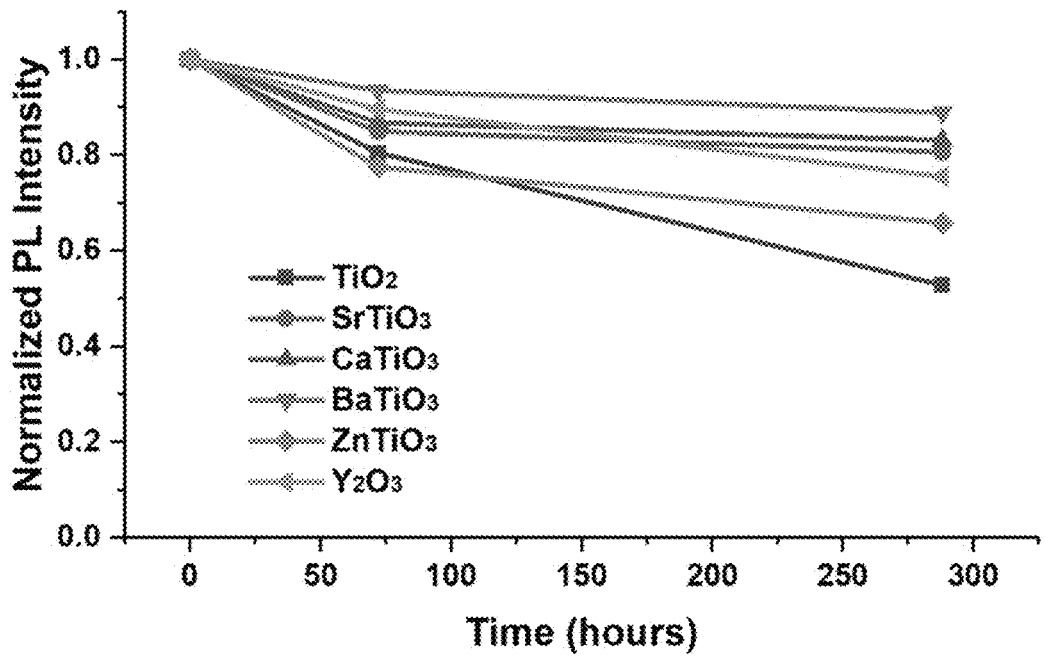
FIG. 18 shows normalized photoluminescence recorded during the high flux accelerated test of the films using different types of light scattering particles.

The obtained films were exposed to the high flux accelerated reliability test described above. During the accelerated test, the emission intensity of the films was measured and compared. FIG. 18 shows the comparison of the resulting intensities. After 288 hours of testing, it is clear that different types of light scattering particles have different effects on the stability of films. $BaTiO_3$ and $CaTiO_3$ have less of a negative effect on the stability of films than other light scattering particles tested. The $SrTiO_3$, $CaTiO_3$, $BaTiO_3$, $ZnTiO_3$, and $Y_2O_3$ nanoparticles all performed better than $TiO_2$.

Example 6

Polymer Mixture

Figure 19:
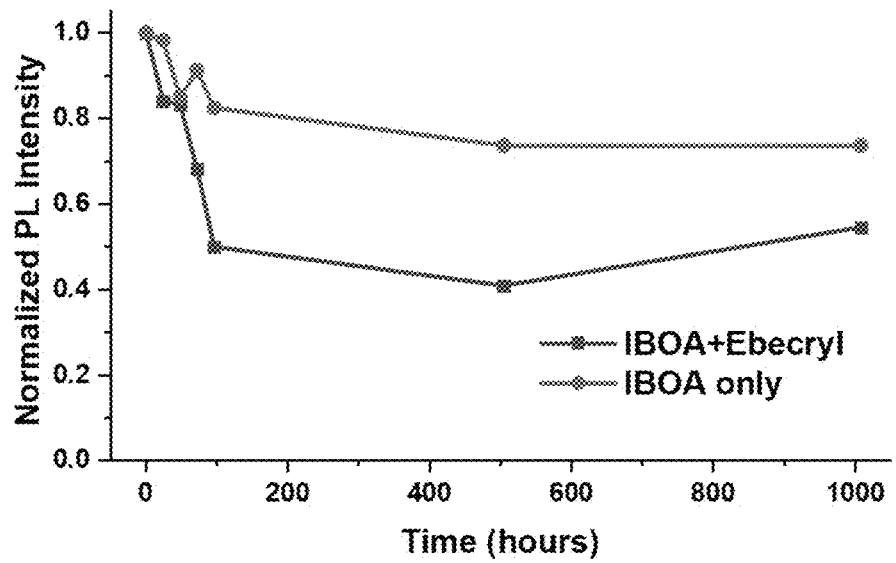
FIG. 19 shows normalized photoluminescence intensity recorded during the high temperature accelerated test on different polymer mixtures (IBOA+Ebecryl-3411).

In typical films, the polymer resins is made from mixing monomers and oligomers. The oligomer is used to control the viscosity of the polymer resins and to provide active sites for the crosslinking with the monomers. In this Example, the polymer composition was varied in order to investigate the impacts on the stability of the perovskite quantum dots. For example, Ebecryl® 3411, a commercially available oligomer that is commonly used in the production of films is not suitable for perovskite quantum dots. As shown in FIG. 19, perovskite quantum dots degrade faster under high temperature test conditions if Ebecryl® 3411 is used in the polymer mixture.

Figure 20:
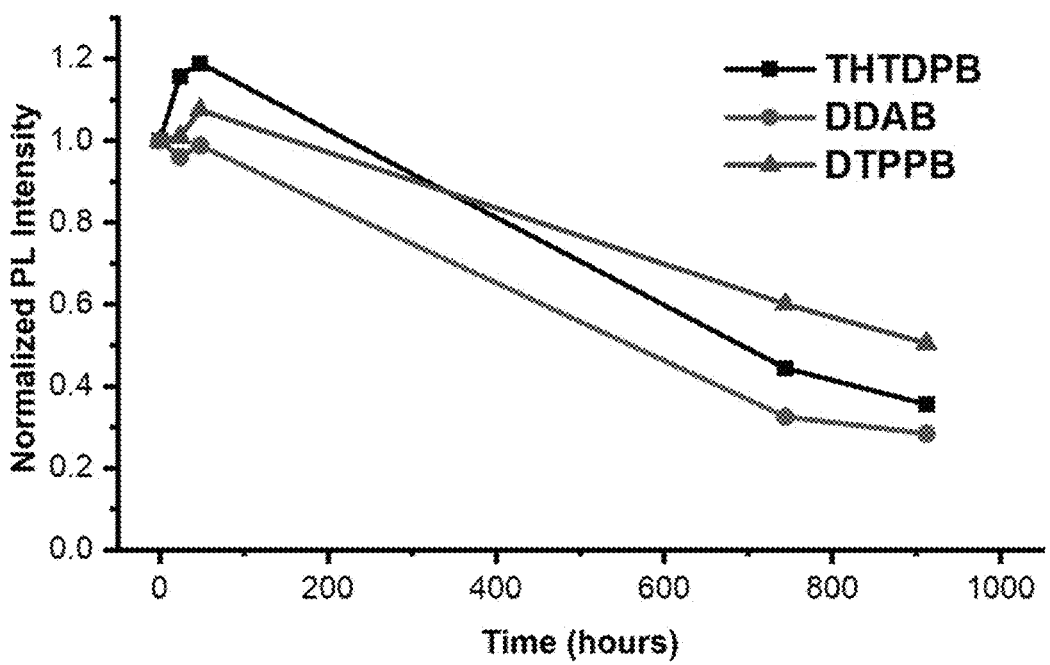
FIG. 20 shows normalized photoluminescence intensity recorded during the high temperature accelerated test on a polymer mixture (IBOA+PEVA) with different additives.

Another polymer mixture (IBOA+poly(ethylene-co-vinyl acetate) (PEVA)) with a different organic halide additive was tested under high flux accelerated test conditions. The results show that the stability of the films did not improve, as shown in FIG. 20.

Figure 21:
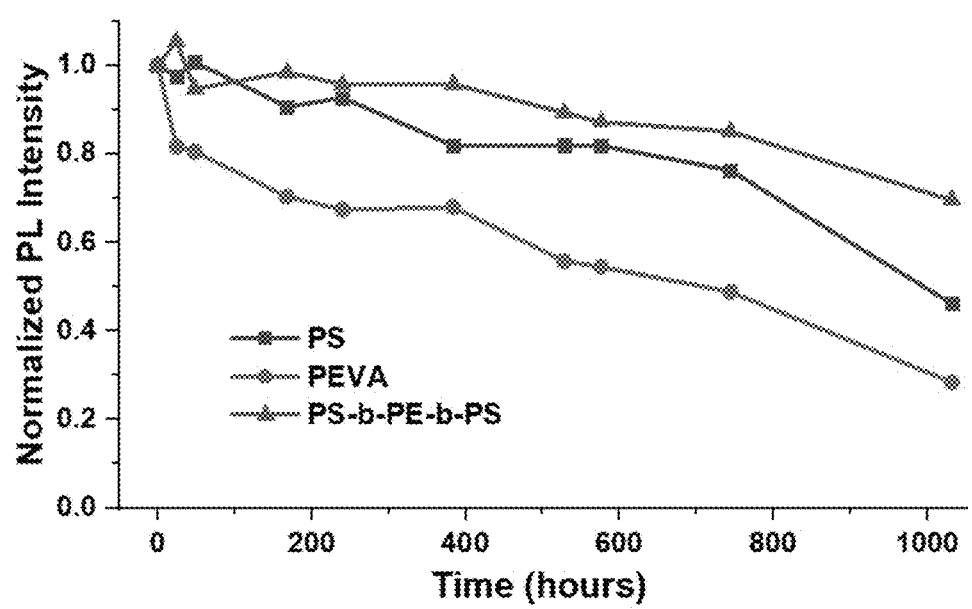
FIG. 21 shows normalized photoluminescence intensity recorded during the high flux accelerated test on different polymer mixtures.

Further polymer mixtures were tested. A mixture of IBOA with a polystyrene (PS) based polymer or oligomer provided the best stabilization of the perovskite quantum dots under high flux irradiation. FIG. 21 shows the comparison of the normalized emission intensity during the test. From the results, a combination of IBOA with polystyrene-block-poly(ethylene-ran-butylene)-block-polystyrene (PS-b-PE-b-PE) had the best performance in improving the stability of the films under the high flux accelerated test, and outperformed PS and poly(ethylene-co-vinyl acetate) (PEVA).

Example 7

Comparison of the Disclosed Films to a Commercially Available Product

Figure 22:
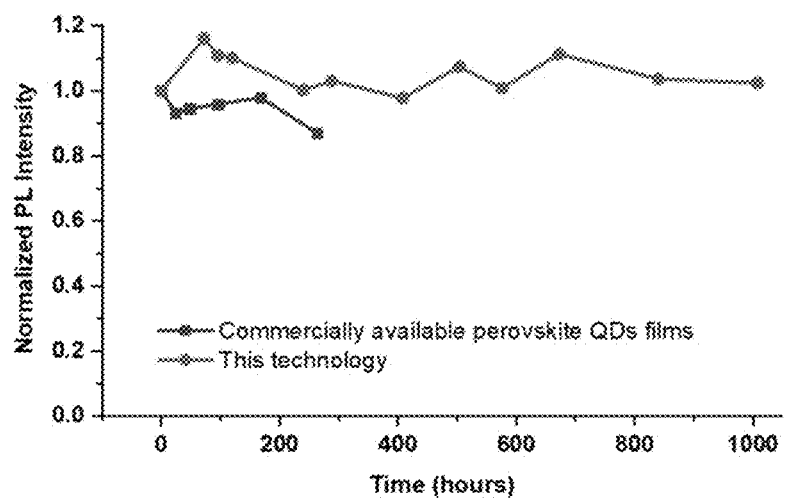
FIG. 22 shows the performance comparison of a film of the disclosure to a commercially available product under high temperature test (a) and under high flux test (b).
Figure 22:
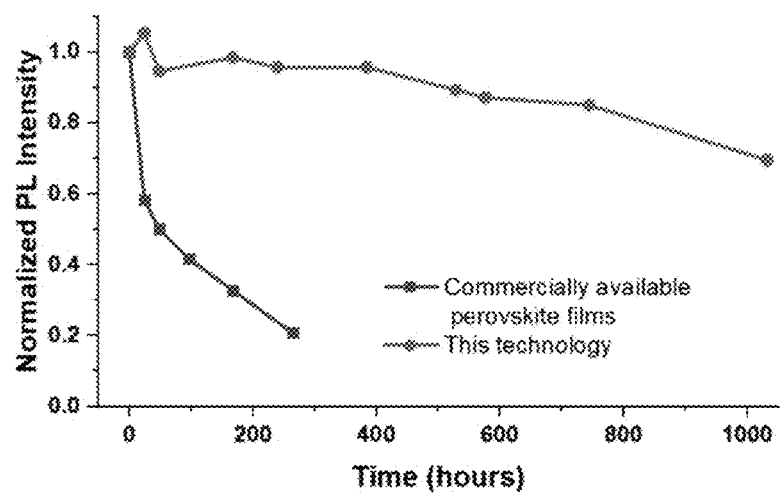

The performance of the presently disclosed films was compared to a commercially available product. The results show that the disclosed firms outperform the current available product in both accelerated test conditions. In particular, high stability is shown under high flux test in the comparison (FIG. 22 (b)).

Example 8

Display Performance of the Disclosed Films

The presently disclosed films were tested in LCD display prototypes with different configurations. The configurations included different types of backlight as schematically shown in FIG. 2A (pink/magenta LED backlight) and FIG. 2B (blue and red LED backlight), with the green emissive films that included $CsPbBr_3$ QDs. Films with combined green emissive $CsPbBr_3$ QDs and red emissive phosphors ($Mn^{4+}$-Doped $K_2SiF_6$) were also used in configurations with blue LED as backlight, as schematically shown in FIG. 3. Color gamut performance of these configurations are compared and summarized in the table below.

| Backlight type | | Rec2020 | DCI-P3 | sRGB | Brightness |
|---|---|---|---|---|---|
| Pink/Magenta LEDs direct lit (FIG. 2A) | Coverage | 85% | 96% | 98% | 2000 nits |
| | Ratio | 85% | 118% | 160% | |
| Pink/Magenta LEDs edge lit (FIG. 2A) | Coverage | 84% | 92% | 98% | 1000 nits |
| | Ratio | 86% | 117% | 158% | |
| Blue and red LED (FIG. 2B) | Coverage | 80% | 88% | 96% | 700 nits |
| | Ratio | 81% | 111% | 150% | |
| Blue LEDs lit with green + red emissive film (FIG. 3) | Coverage | 81% | 89% | 97% | 500 nits |
| | Ratio | 81% | 114% | 154% | |

Figure 23:
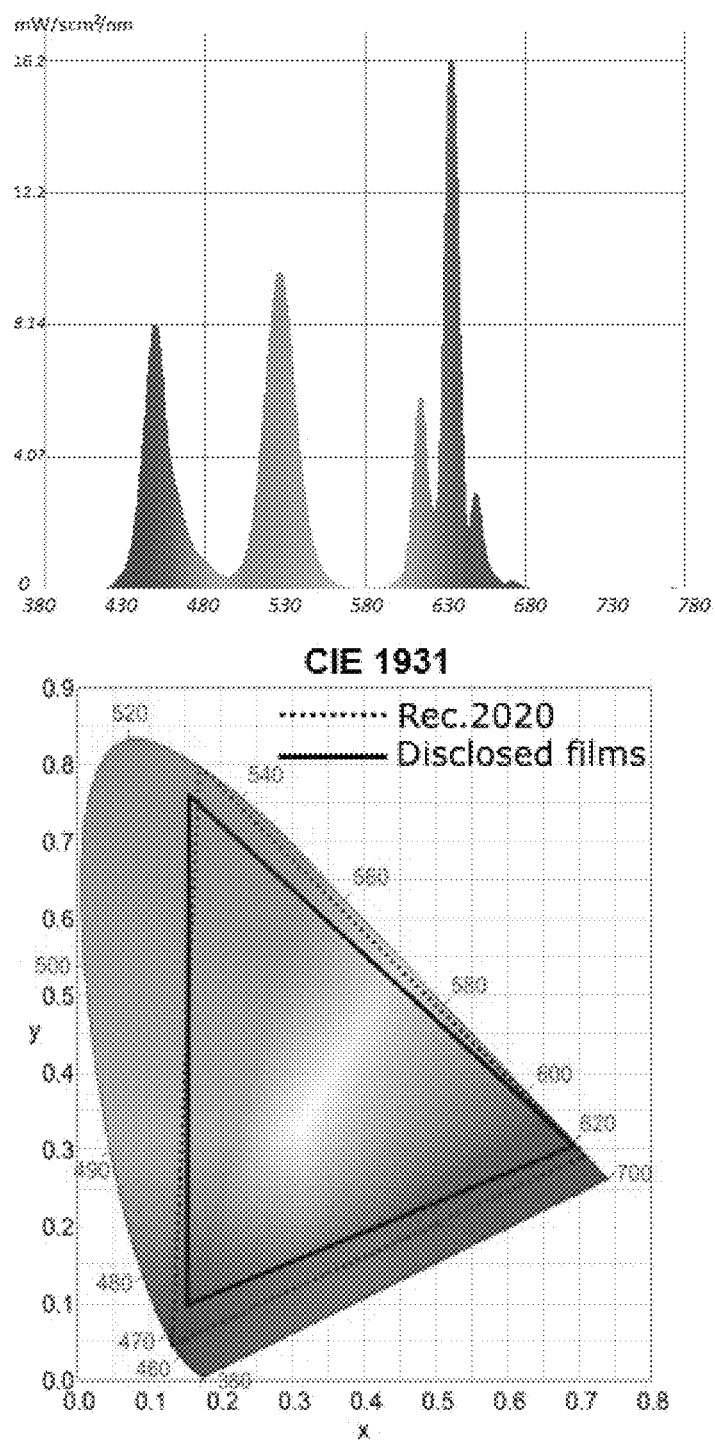
FIG. 23 shows the RGB color composition from a LCD display prototype using magenta LED backlight with the disclosed green film with $CsPbBr_3$ QDs (upper) and the corresponding color gamut performance as compared to standard Color Gamut Rec. 2020 (lower).
Figure 24:
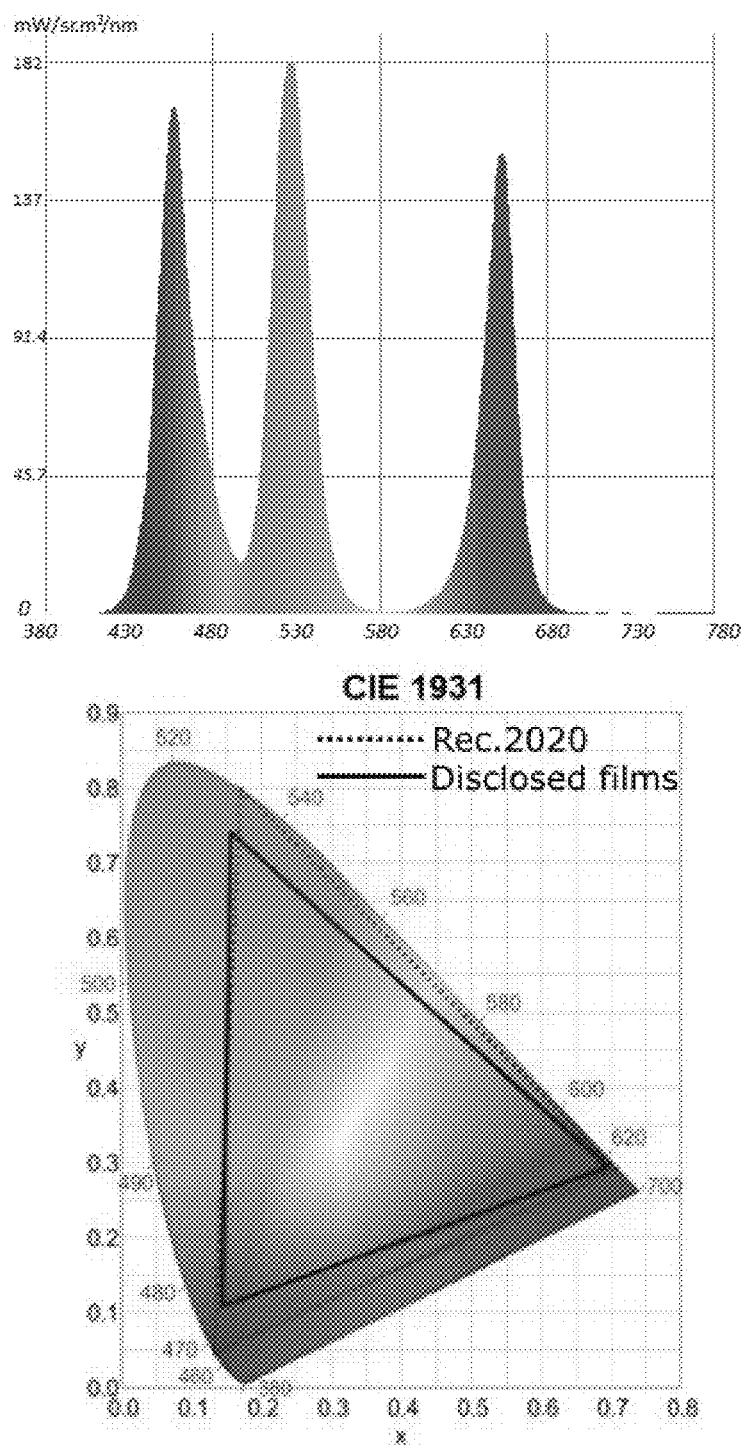
FIG. 24 shows the RGB color composition from a LCD display prototype using blue and red LED backlight with the current disclosed films with $CsPbBr_3$ QDs (upper) and their corresponding color gamut performance as compared to standard Color Gamut Rec. 2020 (lower).

Examples of the RGB emission and color gamut area of the LCD displays tested are shown in FIG. 23 and FIG. 24.

FIG. 23 shows the RGB color composition from a LCD display prototype using magenta LED backlight with the disclosed green film with $CsPbBr_3$ QDs (upper) and the corresponding color gamut performance as compared to standard Color Gamut Rec. 2020 (lower).

FIG. 24 shows the RGB color composition from a LCD display prototype using blue and red LED backlight with the current disclosed films with $CsPbBr_3$ QDs (upper) and their corresponding color gamut performance as compared to standard Color Gamut Rec. 2020 (lower).

Figure 25:
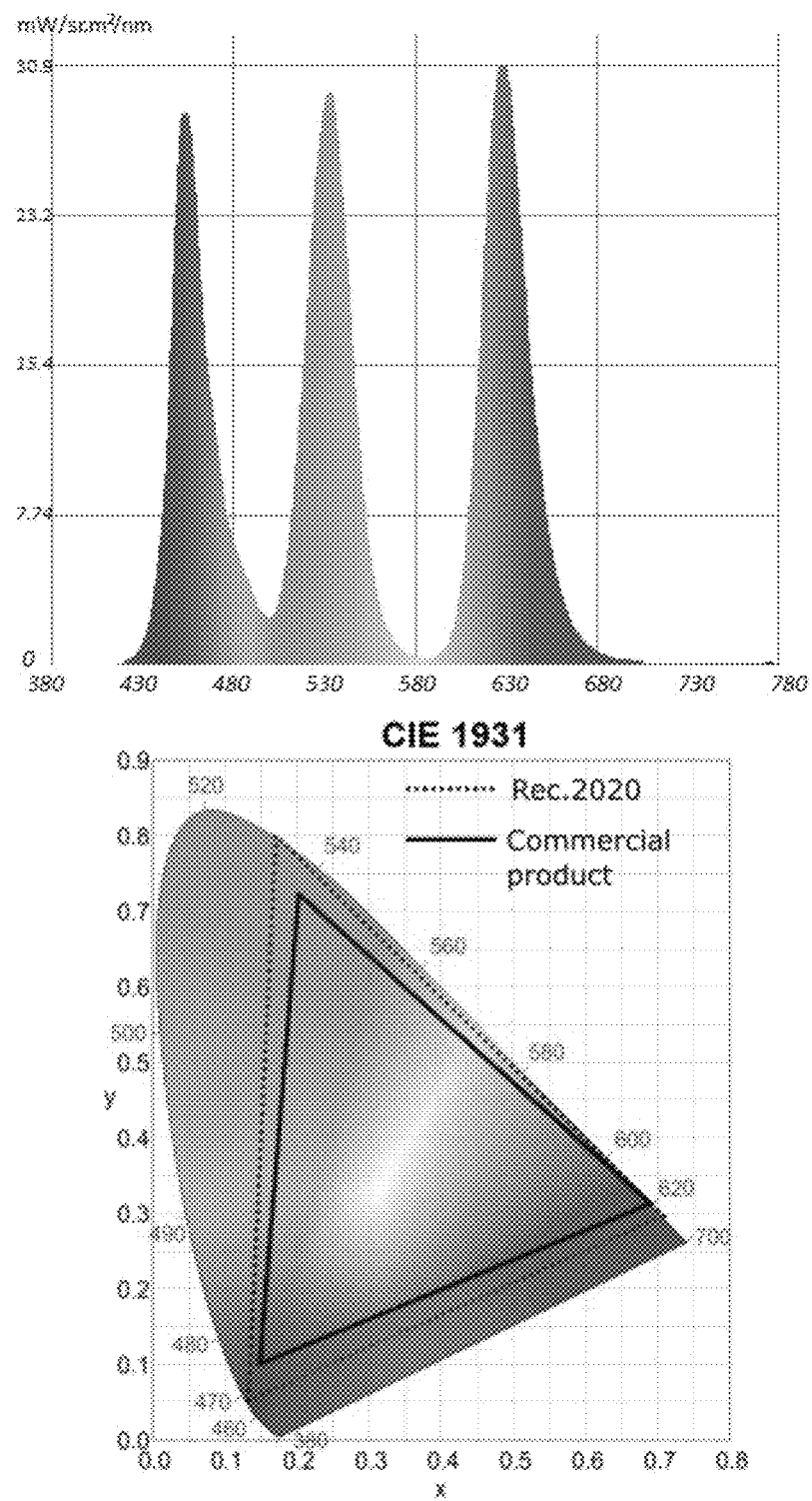
FIG. 25 shows the RGB color composition from a LCD display prototype using blue LED backlight with the commercial QD films containing green and red emissive QDs (CdSe or InP QDs) mixture (upper) and their corresponding color gamut performance, as compared to standard Color Gamut Rec. 2020 (lower).

These LCD displays show a better color performance as compared to the currently commercially available QDs film (e.g., CdSe or InP QDs), which gave about 77% Rec 2020 color gamut coverage and ratio with the same LCD display configuration (see, FIG. 25).

FIG. 25 shows the RGB color composition from a LCD display prototype using blue LED backlight with the commercial QD films containing green and red emissive QDs (CdSe or InP QDs) mixture (upper) and their corresponding color gamut performance, as compared to standard Color Gamut Rec. 2020 (lower).

Using the films disclosed herein, the color performance of LCD displays is improved by 5-10% as compared to currently available LCD displays and reach 81-85% Rec2020 color gamut coverage. As can be seen from the color gamut comparison between FIG. 23 and FIG. 25, there is significant improvement in the green color coordinate.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A material comprising:
a monomer or a polymer;
perovskite quantum dots interspersed in the monomer or the polymer, each of the perovskite quantum dots independently having the formula: $CsPbBr_3$
an additive interspersed in the monomer or the polymer, the additive comprising:
(i) a bromide-based additive and
(ii) a light scattering agent is $SrTiO_3$, $CaTiO_3$, $BaTiO_3$, $ZnTiO_3$, $Y_2O_3$, or a combination thereof.

2. The material of claim 1, wherein the bromide-based additive comprises a metal bromide salt, an organic bromide salt, or a combination thereof.

3. The material of claim 2, wherein the metal bromide salt comprises $MgBr_2$, $CaBr_2$, $AlBr_3$, $ZnBr_2$, or a combination thereof.

4. The material of claim 2, wherein the metal bromide salt comprises LiBr, NaBr, KBr, RbBr, CsBr, or a combination thereof.

5. The material of claim 2, wherein the organic bromide salt comprises an ammonium salt, a sulfonium salt, a phosphonium salt, or a combination thereof.

6. The material of claim 5, wherein the ammonium salt comprises Tetraoctylammonium bromide, Didodecyldimethylammonium bromide, Tetrabutylammonium bromide, Tetraoctylammonium bromide, Hexadecyltrimethylammonium bromide, Trimethyloctadecylammonium bromide, Myristyltrimethylammonium bromide, or a combination thereof, and wherein the sulfonium salt comprises dimethyl (octyl) sulfonium bromide; (Ethoxycarbonylmethyl)dimethylsulfonium bromide; dimethyl (2-phenylethyl) sulfonium bromide; Benzyl(diethyl) sulfonium bromide; dimethyl [1-(4-methylphenyl)ethyl]sulfonium bromide; [1-(dimethylamino)-4-pentenylidene]-2-propenyl sulfonium bromide; [1-(dimethylamino)-3-methyl-4-pentenylidene]-2-propenyl sulfonium bromide; or a combination thereof.

7. The material of claim 5, wherein
the phosphonium salt is a phosphonium bromide salt comprising Tetrabutylphosphonium bromide, Tributyl (hexadecyl) phosphonium bromide, Tetraoctylphosphonium bromide, Trihexyltetradecylphosphonium bromide, Dodecyltriphenylphosphonium bromide, Bis(triphenylphosphoniomethyl)benzene dibromide, Benzyltriphenylphosphonium bromide, polymer-bound or a combination thereof.

8. The material of claim 7, wherein the bromide-based additive is present in a concentration of no more than 10%, by weight.

9. The material of claim 7, wherein the polymer comprises a mixture of acrylate and styrene-based polymers.

10. The material of claim 7, wherein the perovskite quantum dots are in a concentration ranging from 0.01% to 75%, by weight.

11. The material of claim 7, further comprising emissive particles, wherein the emissive particles comprise $Mn^{4+}$-doped $K_2SiF_6$ (KSF:Mn), CdSe, CdSe/ZnS, CdSe/ZnSe, CdSe/CdS, InP, InP/ZnS, InP/ZnSe, $CuInS_2$, or combinations thereof.

12. The material of claim 7, further comprising a photoinitiator, a viscosity modifier, or a combination thereof.

13. The material of claim 12, wherein the viscosity modifier comprises $SiO_2$ nanoparticles.

14. The material of claim 1, wherein the perovskite quantum dots have an average diameter ranging from 2 nanometers (nm) to 100 nm.

15. A device comprising the material of claim 1, wherein the device comprises a liquid crystal display (LCD), a light emitting diode (LED), an organic LED (OLED), a microLED, an ultraviolet (UV) detector or an x-ray scintillator.

* * * * *